United States Patent
Suehring et al.

(10) Patent No.: US 11,647,209 B2
(45) Date of Patent: *May 9, 2023

(54) LAYER CHARACTERISTIC SIGNALING IN MULTI-LAYERED CODING

(71) Applicant: GE VIDEO COMPRESSION, LLC, Albany, NY (US)

(72) Inventors: Karsten Suehring, Berlin (DE); Thomas Schierl, Berlin (DE); Detlev Marpe, Berlin (DE); Robert Skupin, Berlin (DE); Yago Sanchez de la Fuente, Berlin (DE); Gerhard Tech, Berlin (DE)

(73) Assignee: GE Video Compression, LLC, Albany, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/211,542

(22) Filed: Mar. 24, 2021

(65) Prior Publication Data

US 2021/0211687 A1    Jul. 8, 2021

Related U.S. Application Data

(63) Continuation of application No. 16/738,075, filed on Jan. 9, 2020, now Pat. No. 11,012,700, which is a
(Continued)

(51) Int. Cl.
*H04N 19/30* (2014.01)
*H04N 19/65* (2014.01)
(Continued)

(52) U.S. Cl.
CPC ........... *H04N 19/30* (2014.11); *H04L 69/324* (2013.01); *H04N 19/119* (2014.11);
(Continued)

(58) Field of Classification Search
CPC ........ H04N 19/63; H04N 19/30; H04N 19/31; H04N 19/66
See application file for complete search history.

(56) References Cited

U.S. PATENT DOCUMENTS 9,497,458 B2 * 11/2016 Sasai .................... H04N 19/573
9,912,966 B2    3/2018 Hannuksela
(Continued)

FOREIGN PATENT DOCUMENTS

| CN | 1263421 A | 8/2000 |
|---|---|---|
| CN | 1483289 A | 3/2004 |

(Continued)

OTHER PUBLICATIONS

System Layer Integration of High Efficiency video coding; Schierl; 2012. (Year: 2012).*
(Continued)

*Primary Examiner* — Luis Perez-Fuentes
(74) *Attorney, Agent, or Firm* — Morgan, Lewis & Bockius LLP

(57) ABSTRACT

A signaling of at least one characteristic for layers of a multi-layered video signal such as, for example, for each layer the indication of dependent layers to which the respective layer directly relates via inter-layer prediction, or the signaling of the afore-mentioned second inter-dependency syntax structure, is described. A maximum syntax element is signaled within the multi-layered video signal to indicate a maximally used value of an extension layer-ID field of the packets of the multi-layered video signal, the scope of the maximum syntax element being, for example, a predetermined portion of the multi-layered video signal extending, for example, across several portions of the multi-layered video signal. Accordingly, it is feasible for devices such as decoders or network elements receiving the multi-layered video signal to gain, for a relatively large predetermined
(Continued)

portion of the multi-layered video signal, knowledge about the actually consumed portion of the possible domain of possible values.

20 Claims, 19 Drawing Sheets

Related U.S. Application Data continuation of application No. 14/995,244, filed on Jan. 14, 2016, now Pat. No. 10,595,027, which is a continuation of application No. PCT/EP2014/065182, filed on Jul. 15, 2014.

(60) Provisional application No. 61/846,479, filed on Jul. 15, 2013.

(51) Int. Cl.

| | | |
|---|---|---|
| *H04N 19/70* | (2014.01) | |
| *H04L 69/324* | (2022.01) | |
| *H04N 19/187* | (2014.01) | |
| *H04N 19/423* | (2014.01) | |
| *H04N 19/44* | (2014.01) | |
| *H04N 19/50* | (2014.01) | |
| *H04N 19/85* | (2014.01) | |
| *H04N 19/119* | (2014.01) | |
| *H04N 19/166* | (2014.01) | |
| *H04N 19/174* | (2014.01) | |
| *H04N 19/593* | (2014.01) | |
| *H04N 19/66* | (2014.01) | |
| *H04N 19/89* | (2014.01) | |
| *H04N 19/91* | (2014.01) | |
| *H04N 19/33* | (2014.01) | |

(52) U.S. Cl.
CPC ......... *H04N 19/166* (2014.11); *H04N 19/174* (2014.11); *H04N 19/187* (2014.11); *H04N 19/33* (2014.11); *H04N 19/423* (2014.11); *H04N 19/44* (2014.11); *H04N 19/50* (2014.11); *H04N 19/593* (2014.11); *H04N 19/65* (2014.11); *H04N 19/66* (2014.11); *H04N 19/70* (2014.11); *H04N 19/85* (2014.11); *H04N 19/89* (2014.11); *H04N 19/91* (2014.11)

(56) References Cited

U.S. PATENT DOCUMENTS

| | | | |
|---|---|---|---|
| 10,142,639 B2* | 11/2018 | Suehring | H04N 19/85 |
| 10,349,065 B2 | 7/2019 | Suehring et al. | |
| 10,349,066 B2* | 7/2019 | Suehring | H04N 19/166 |
| 10,425,651 B2 | 9/2019 | Suehring et al. | |
| 10,595,027 B2* | 3/2020 | Suehring | H04N 19/44 |
| 10,609,399 B2 | 3/2020 | Suehring et al. | |
| 10,616,591 B2* | 4/2020 | Suehring | H04N 19/33 |
| 10,869,047 B2* | 12/2020 | Suehring | H04N 19/91 |
| 11,012,700 B2* | 5/2021 | Suehring | H04N 19/91 |
| 2002/0080802 A1 | 6/2002 | Sachs et al. | |
| 2005/0147053 A1 | 7/2005 | Saito | |
| 2006/0168517 A1 | 7/2006 | Itoh et al. | |
| 2007/0110150 A1 | 5/2007 | Wang et al. | |
| 2008/0007438 A1 | 1/2008 | Seagall et al. | |
| 2008/0031347 A1 | 2/2008 | Segall | |
| 2008/0036854 A1 | 2/2008 | Elliott et al. | |
| 2008/0165855 A1 | 7/2008 | Wang et al. | |
| 2009/0125636 A1 | 5/2009 | Li et al. | |
| 2009/0175353 A1 | 7/2009 | Suh et al. | |
| 2009/0225870 A1 | 9/2009 | Narasimhan | |
| 2010/0246816 A1 | 9/2010 | Thomas et al. | |
| 2012/0147140 A1 | 7/2012 | Itakura et al. | |
| 2012/0183060 A1 | 7/2012 | Hong et al. | |
| 2012/0183077 A1 | 7/2012 | Hong | |
| 2013/0028316 A1 | 1/2013 | Leontaris et al. | |
| 2013/0101035 A1 | 4/2013 | Wang et al. | |
| 2013/0114735 A1 | 5/2013 | Wang | |
| 2013/0176387 A1 | 7/2013 | Suh et al. | |
| 2014/0003489 A1 | 1/2014 | Hannuksela | |
| 2014/0092994 A1 | 4/2014 | Wang | |
| 2014/0301451 A1 | 10/2014 | Deshpande | |
| 2014/0301477 A1 | 10/2014 | Deshpande | |
| 2014/0334557 A1 | 11/2014 | Schierl et al. | |
| 2015/0003474 A1 | 1/2015 | Thomas et al. | |
| 2015/0023409 A1 | 1/2015 | Schierl et al. | |
| 2015/0208095 A1 | 7/2015 | Schierl et al. | |
| 2015/0271507 A1 | 9/2015 | Hendry et al. | |
| 2016/0014430 A1 | 1/2016 | Hinz et al. | |
| 2016/0057441 A1 | 2/2016 | Skupin et al. | |
| 2016/0080755 A1 | 3/2016 | Toma | |
| 2016/0134895 A1 | 5/2016 | Suehring | |
| 2016/0156936 A1 | 6/2016 | Suehring | |
| 2020/0195942 A1 | 6/2020 | Suehring et al. | |

FOREIGN PATENT DOCUMENTS

| | | |
|---|---|---|
| CN | 1759384 A | 4/2006 |
| CN | 101317214 A | 12/2008 |
| CN | 101317460 A | 12/2008 |
| CN | 101529911 A | 9/2009 |
| CN | 101543018 A | 9/2009 |
| CN | 102484561 A | 5/2012 |
| CN | 102714725 A | 10/2012 |
| CN | 103096078 A | 5/2013 |
| EP | 1443774 A1 | 8/2004 |
| EP | 2587804 A1 | 5/2013 |
| JP | 2000078197 A | 3/2000 |
| JP | 2001203749 A | 7/2001 |
| JP | 2010516085 A | 5/2010 |
| JP | 2012010066 A | 1/2012 |
| JP | 6951405 B2 | 9/2021 |
| KR | 10-2010-0119002 A | 11/2010 |
| KR | 1020140131926 A | 11/2014 |
| KR | 1020150029723 A | 3/2015 |
| KR | 101930817 B1 | 12/2018 |
| KR | 10-2067231 B1 | 7/2020 |
| KR | 10-2162120 B1 | 10/2020 |
| KR | 10-2162121 B1 | 10/2020 |
| KR | 10-2249228 B1 | 5/2021 |
| WO | 2008085433 A2 | 7/2008 |
| WO | 2008156548 A1 | 10/2008 |
| WO | 2009111519 A1 | 9/2009 |
| WO | 2011161922 A1 | 12/2011 |
| WO | 2012/096981 A1 | 7/2012 |
| WO | 2013027407 A1 | 2/2013 |
| WO | 2013063094 A1 | 5/2013 |

OTHER PUBLICATIONS

Overview of HEVC high-level syntax and reference picture management; Sjoberg; 2012. (Year: 2012).*
Layer identifier extension for MV-HEVC and other HEVC extension; Choi etal; 2013. (Year: 2013).*
3D-MV HEVC HLS—Flexible later clustering for extending layers; Sushring; 2013. (Year: 2013).*
Notice of Issuance issued in corresponding Chinese Patent Application No. 2019101820871 dated Aug. 5, 2021.
Office Action issued in corresponding Japanese Patent Application No. 2020-104959 dated Jul. 20, 2021.
Office Action issued in corresponding Japanese Patent Application No. 2018-121752 (Appeal No. 2020-008460) dated Aug. 3, 2021, with English translation.
Notice of Allowance issued in corresponding Japanese Patent Application No. 2019-228823 dated Aug. 24, 2021.
Choi, Byeongdoo, et al., "NAL unit header for scalable extension", Joint Collaborative Team on Video Coding (JCT-VC) of ITU-T SG 16 WP 3 and ISO/IEC JTC 1/SC 29/WG 11, 9th Meeting: Geneva, CH, Apr. 2012, JCTVC-0132, pp. 2-7.

(56) References Cited

OTHER PUBLICATIONS

Office Action issued in corresponding Japanese Patent Application No. 2020-104939 dated Aug. 24, 2021, with English translation.
Notice of Allowance issued in corresponding Japanese Patent Application No. 2018-233051 dated Sep. 21, 2021, with English translation.
Extended European Search Report issued in corresponding European Patent Application 21 164 360.6-1208 dated Oct. 4, 2021.
Office Action issued in corresponding Korean Patent Application No. 10-2021-7006065 dated May 18, 2021, with English translation.
Decision to Grant Patent issued in corresponding Korean Patent Application No. 10-2020-7000840 dated Jul. 1, 2021, with English translation.
Notice of Issuance in corresponding Chinese Patent Application No. 201910310534.7 dated Jul. 6, 2021.
Shujuan Chang, "Wavelet Transform in Image Compression", Technology Innovation Forum, Jun. 23, 2010.
Office Action issued in corresponding Korean Patent Application No. 10-2021-7013229 dated Jul. 17, 2021, with English translation.
Office Action issued in corresponding Chinese Patent Application No. 201910182087.1 dated Jan. 27, 2021.
Decision to Grant a Patent issued in corresponding Korean Patent Application No. 10-2020-70000920 dated Jan. 29, 2021, with English translation.
Office Action issued in corresponding Chinese Patent Application No. 201910310534.7 dated Jan. 27, 2021.
Decision to Grant a Patent issued in corresponding Korean Patent Application No. 10-2020-7027744 dated Jan. 29, 2021, with English translation.
Office Action dated Aug. 4, 2020 in Japanese Application 2018-233051.
Decision to Grant dated Oct. 6, 2020 in Japanese Patent Application 2019-075436.
Office Action dated Oct. 22, 2020 in European Application 14744010.1.
Notice of Issuance dated Jun. 30, 2020 in Chinese Application 201480050665.1.
Decision to Grant dated Jun. 28, 2020 in Korean Application 10-2018-7036223.
Decision to Grant dated Jun. 28, 2020 in Korean Application 10-2018-7033436.
G. Tech, et al. 3D/MV-HEVC HLS: Flexible layer clustering for extending the supported number of layers. JCT-VC of ITU-T and ISO/IEC. JCTVC-N0357 Ver.1, Jul. 25, 2013, pp. 1-9.
G. Tech, et al. 3D/MV-HEVC HLS: Dependency signaling for extending the supported number of layers. JCT-VC of ITU-T and ISO/IEC. JCTVC-N0356 Ver.1, Jul. 25, 2013, pp. 1-7.
Decision to Grant dated Jun. 28, 2020 in Korean Application 10-2018-7031313.
Decision to Grant dated Jul. 14, 2020 in Japanese Application 2018-121768.
Office Action dated Jun. 2, 2020 in U.S. Appl. No. 16/395,761.
Office Action dated Jun. 25, 2020 in U.S. Appl. No. 16/552,342.
Office Action dated Jul. 28, 2020 in U.S. Appl. No. 16/795,655.
Notice of Allowance dated Aug. 7, 2020 in U.S. Appl. No. 16/802,620.
Office Action dated Feb. 27, 2020 in Korean Application 10-2020-7000840.
Office Action dated Feb. 28, 2020 in Korean Application 10-2020-7000920.
Office Action dated Mar. 2, 2020 in Chinese Application 201480050665.1.
Summons to Attend Oral Proceedings dated Mar. 16, 2020 in European Application 14744 010.1.
Office Action dated Feb. 18, 2020 in Japanese Application 2018-121768.
Office Action dated Feb. 18, 2020 in Japanese Application 2018-121752.
Summons to Attend Oral Proceedings dated dated Mar. 2, 2020 in European Application 14741559.0.
Office Action dated Mar. 17, 2020 in Japanese Application 2019-075436.
Priority application, U.S. Appl. No. 61/749,042, filed Jul. 15, 2013, 43 pages.
International Search Report, dated Oct. 8, 2014, from parallel International Patent Application No. PCT/EP2014/065181, 3 pages.
International Search Report, dated Aug. 22, 2014, from parallel International Patent Application No. PCT/EP2014/065182, 2 pages.
International Search Report, dated Oct. 29, 2014, from parallel International Patent Application No. PCT/EP2014/065183, 3 pages.
International Search Report, dated Oct. 23, 2014, from parallel International Patent Application No. PCT/EP2014/065184, 3 pages.
International Search Report, dated Aug. 19, 2014, from parallel International Patent Application No. PCT/EP2014/065185, 3 pages.
Bross, B., et al., "High Efficiency Video Coding (HEVC) text specification draft 10", JCTVC-L1003_v34, Geneva, CH, Jan. 14-23, 2013, 310 pages.
Tech, G., et al., "MV-HEVC Draft Text 3", JCT3V-C1004_d3, Geneva, CH, Jan. 17-23, 2013, 34 pages.
Tech, G., et al., "3D-HEVC Test Model description, draft specification", JCT3V-C1005_d0, Geneva, CH, Jan. 17-23, 2013, 142 pages.
Wilburn, B., et al., "High Performance Imaging Using Large Camera Arrays", ACM Transactions on Graphics, 2005, vol. 24, No. 3, pp. 765-776, 12 pages.
Wilburn, B., et al., "The Light Field Video Camera", Electronic Imaging 2002, International Society for Optics and Photonics, 2001, pp. 29-36, 8 pages.
Horimai, H., et al., "Full-Color 3D Display System with 360 Degree Horizontal Viewing Angle", Proc. Int. Symposium of 3D and Contents, 2010, pp. 7-10, 4 pages.
Suehring, K., et al., "MV-HEVC/SHVC HLS: Extending the supported number of layers", JCT3V-D0211_v1, Incheon, KR, Apr. 20-26, 2013, 7 pages.
Wang, Y.-K., et al., "Report of the joint BoG on high-level syntax", JCTVC-M0450_v5, Incheon, KR, Apr. 18-26, 2013, 33 pages.
Tech, G., et al., "3D/MV-HEVC HLS: Dependency signaling for extending the supported No. of layers", JCT3V-E0223, Vienna, AT, Jul. 27-Aug. 2, 2013, 7 pages.
Tech, G., et al., "3D/MV-HEVC HLS: Flexible layer clustering for extending the supported number of layers", JCTVC-N0357, Vienna, AT, Jul. 25-Aug. 2, 2013, 9 pages.
Hendry, H., et al., "AHG 9: On dependent slice", JCTVC-K0167, Shanghai, CN, Oct. 10-19, 2012, 4 pages.
Sjoberg, R., et al., "Overview of HEVC High-Level Syntax and Reference Picture Management", IEEE Trans. Circuits Syst. Video Technol., vol. 22, No. 12, pp. 1858-1870, 13 pages.
Ruijin, F., et al., "Scalable Layered MPEG-2 Video Multicast Architecture", IEEE Trans. Consumer Electronics, vol. 47, No. 1, pp. 55-62, 8 pages.
Li, H., et al., "Adaptive Reed-Solomon Code Protection of Data Partitioned H.264 Video", Proc. 5th IEEE Int. Conf. Intelligent Information Hiding and Multimedia Signal Processing, 2009, pp. 122-127, 6 pages.
Choi, B., et al., "Layer identifier extension for MV-HEVC and other HEVC extension", JCT3V-D0238, Incheon, KR, Apr. 20-26, 2013, 3 pages.
Suehring, K., et al., "Ultra-low delay multi-layer decoding by interleaving of decoding units in SHVC and 3D/MV-HEVC", JCTVC-M0204, Incheon, KR, Apr. 18-26, 2013, 6 pages.
Kazui, K., et al., "AHG9: Improvement of HRD for sub-picture based operation", JCTVC-J0136, Stockholm, SE, Jul. 11-20, 2012, 10 pages.
Skupin, R., et al., "Ultra-low delay with SHVC, MV-HEVC and 3DHEVC", JCT3V-E0098, Vienna, AT, 27 Jul. 27-Aug. 2, 2013, 5 pages.
Office Action dated Feb. 7, 2017 in Japanese Application 2016-526590.
Office Action dated Jan. 24, 2017 in Japanese Application 2016-526592.
Office Action dated Jan. 31, 2017 in Japanese Application 2016-526591.

(56) References Cited

OTHER PUBLICATIONS

Office Action dated Jan. 31, 2017 in European Application 14741559. 0.
Office Action dated Feb. 2, 2017 in European Application 14738867. 2.
Choi B. et al., "Layer identifier extension", Joint Collaborative Team on Video Coding (JCT-VC) of ITU-T SG16 WP3 and ISO/IEC JTC1/SC29/WG11 13th Meeting: Incheon, KR, Apr. 18-26, 2013, [JCTVC-M0164].
Deshpande S. et al., "On Sub-picture Based CPB", Joint Collaborative Team on Video Coding (JCT-VC) of ITU-T SG16 WP3 and ISO/IEC JTC1/SC29/WG11 10th Meeting: Stockholm, SE, Jul. 11-20, 2012, U.S., JCTVC, Jul. 16, 2012, JCTVC-J0306, p. 1-p. 8, URL, http://phenix.it-sudparis.eu/jct/index.php.
Suehring K et al.: "3D/MV-HEVG HLS: Study and proposal of methods for extending the supported number of layers", 15. JGT-VG Meeting; Oct. 23, 2013-Jan. 11, 2013; Gen Eva; (Joint Collaborative Team on Video Coding of ISO/IEG JTG1/SG29/WG11 Ano ITU-T SG.16 ); URL: http://wftp3.itu.int/av-arch/jctvc-site/No. jctvc-00200, Oct. 15, 2013 (Oct. 15, 2013), XP030115242.
Office Action dated Feb. 28, 2017 in Japanese Application 2016-526588.
Office Action dated Feb. 28, 2017 in Japanese Application 2016-526589.
Office Action dated Mar. 1, 2018 in U.S. Appl. No. 14/995,222.
Notification of the First Office Action Chinese Patent Application No. 2014800506280 dated Jan. 26, 2018.
Non final Office Action U.S. Appl. No. 14/995,260 dated Mar. 28, 2018.
Non final Office Action U.S. Appl. No. 14/995,244 dated Apr. 3, 2018.
Non final Office Action U.S. Appl. No. 14/995,430 dated May 10, 2018.
Non-final Office Action U.S. Appl. No. 14/995,399 dated Jun. 11, 2018.
Notification of the First Office Action Chinese Patent Application No. 20148005066666 dated Apr. 3, 2018.
Notification of the First Office Action Chinese Patent Application No. 2014800506670 dated Apr. 3, 2018.
Notice of Allowance U.S. Appl. No. 14/995,222 dated Jul. 11, 2018.
Office Action Korean Patent Application No. 10-2016-7003788 dated Aug. 21, 2018.
K. Suehring, et al. 3D/MV-HEVC HLS: Extending the supported number of layers. JCTVC of ITU-T and ISO/IEC. JCTVC-N0355 Ver.2, Jul. 30, 2013, pp. 1-8.
Decision to Grant a Patent Korean Patent Application No. 10-2016-7003789 dated Sep. 18, 2018.
Office Action European Patent Application No. 14741559.0 dated Nov. 7, 2018.
Office Action Taiwanese Patent Application No. 106133748 dated Oct. 31, 2018.
Office Action European Patent Application No. 14744010.0 dated Nov. 7, 2018.
Decision to Grant Japanese Patent Application No. 2016-526592 dated Nov. 13, 2018.
Notice of Decision of Rejection Korean Patent Application No. 10-2016-7002764 dated Nov. 28, 2018.
Notification of the Second Office Action chinese Patent Application No. 2014800506651 dated Dec. 12, 2018.
Non-final Office Action U.S. Appl. No. 16/157,723 dated Dec. 20, 2018.
Tiesong ZHAO et al., Fast Inter-Layer Mode Decision in Scalable Video Coding, Proceedings of the 2010 IEEE 17th International Conference on Image Processing, Sep. 26-29, 2010, pp. 4221-4224.
Notice of Allowance U.S. Appl. No. 14/995,399 dated Jan. 9, 2019.
Final Office Action U.S. Appl. No. 14/995,244 dated Jan. 10, 2019.
Notice of Allowance U.S. Appl. No. 14/995,260 dated Jan. 31, 2019.
Decision to Grant a Patent dated Mar. 12, 2019 issued in corresponding Japanese Patent Application No. 2016-526591.
Notice of Allowance U.S. Appl. No. 16/157,723 dated Apr. 3, 2019.

Non-final Office Action U.S. Appl. No. 14/995,244 dated May 1, 2019.
NPL Internet Google Search 201913—www.google.com/search?rlv=1C1GCEA_enUS798US799&biw=1229&bih=651&tbs=cdr%3A1%2Ccd_max%3a7%2F14%2f2013&ei=z7. . . .
T. Schierl et al., "System Layer Integration of High Efficiency Video Coding" IEEE Transactions on circuits and Systems for Video Technology, vol. 22, No. 12, Dec. 2012, pp. 1871-1884.
Kyungmo PARK et al., International Organisation for Standardisation Organization Internationale De Normalisation ISO/IEC JTC1/SC29/WG11 Codin Gof Moving Pictures and Audio, Jul. 2011, Torino Italy.
Gary J. Sullivan et al., "Overview of the High Efficiency Video Coding (HEVC) Standard", IEEE Transactions on Circuits and Systems for Video Technology, vol. 22, No. 12, Dec. 2012, pp. 1649-1665.
Notice of Allowance U.S. Appl. No. 14/995,430 dated May 22, 2019.
Notice of Issuance dated Jun. 4, 2019 Chinese Patent Application No. 201480050628.0.
Third Office Action dated Jun. 25, 2019 Chinese Patent Application No. 201480050655.8.
Notification of the Third Office Action Chinese Patent Application No. 2014800506651 dated Jul. 3, 2019.
Notification of Reasons for Refusal Japanese Patent Application No. 2018-008825 dated Jul. 2, 2019.
Office Action dated Jul. 29, 2019 in U.S. Appl. No. 16/377,449.
Office Action dated Aug. 5, 2019 in U.S. Appl. No. 16/460,230.
Office Action dated Jul. 9, 2019 in Japanese Application 2018-121752.
Office Action dated Jul. 9, 2019 in Japanese Application 2018-121768.
Suehring Karsten et al., "3D/MV-HEVG HLS: Extending the supported number of layers", Joint Collaborative Team on 3D Video Coding Extensions of ITU-T SG16 WP3 and ISO/IEC JTC1/SC29/W11, 5th Meeting, Vienna, AT Jul. 27-Aug. 2, 2013.
Suehring K et al.: "3D/MV-HEVG HLS: Extending the supported number of layers", Joint Collaborative Team on 3D Video Coding Extensions of ITU-T SG16 WP3 and ISO/IEC JTC1/SC29/W11, 4th Meeting, Incheon, KR Apr. 20-26, 2013.
Suehring Karsten et al., "3D/MV-HEVG HLS: Dependency signaling for extending the supported number of layers", Joint Collaborative Team on 3D Video Coding Extensions of ITU-T SG16 WP3 and ISO/IEC JTC1/SC29/W11, 5th Meeting, Vienna, AT Jul. 27-Aug. 2, 2013.
Tech, Gerhard et al., "3D/MV-HEVC HLS: Flexible layer clustering for extending the supported number of layers", Joint Collaborative Team on 3D Video Coding Extensions, of ITU-T SG 16 WP 3 and ISO/IEC JTC 1/SC 29/WG 11, 5th Meeting Vienna, AT, Jul. 27-Aug. 2, 2013.
Choi, Byeongdoo et al., "Layer identifier extension for MV-HEVC and other HEVC extension", Joint Collaborative Team on 3D Video Coding Extensions of ITU-T SG16 WP3 and ISO/IEC JTC1/SC29/W11, 4th Meeting, Incheon, KR Apr. 20-26, 2013.
Office Action dated Aug. 27, 2019 in Japanese Application 2016-526588.
Notice of Allowance dated Oct. 9, 2019 in U.S. Appl. No. 14/995,244.
Kyungmo Park et al., Working Draft of MPEG Media Transport, International Organisation for Standardisation, ISO/IEC JTC1/SC29/WG11/N12169, Jul. 2011, Torino, Italy.
Office Action dated Oct. 11, 2019 in U.S. Appl. No. 16/395,761.
Decision to Grant dated Oct. 11, 2019 in Korean Application 10-2018-7036575.
Decision to Grant dated Oct. 11, 2019 in Korean Application 10-2018-7031306.
Office Action dated Oct. 14, 2019 in Korean Application 10-2018-7033436.
Office Action dated Oct. 14, 2019 in Korean Application 10-2018-7031313.
Office Action dated Oct. 15, 2019 in Korean Application 10-2018-7036223.
Notice of Allowance dated Nov. 20, 2019 in U.S. Appl. No. 16/460,230.

(56) References Cited

OTHER PUBLICATIONS

Notice of Allowance dated Nov. 19, 2019 in Japanese Application 2018-224107.
Notice of Allowance dated Nov. 27, 2019 in U.S. Appl. No. 16/377,449.
Notice of Issuance dated Dec. 16, 2019 in Chinese Application 201480050655.8.
Office Action dated Jan. 8, 2020 in European Patent Application 19185269.8.
Office Action dated Jan. 20, 2020 in European Patent Application 19185282.1.
Office Action dated Jan. 7, 2020 in Japanese Application 2018-233051.
Appeal Decision dated Feb. 18, 2020 in Japanese Application 2016-526589.
Office Action issued in corresponding Japanese Patent Application No. 2020-185152 dated Jan. 14, 2022, with English translation.
Office Action issued in corresponding Korean Patent Application No. 10-200-7027743 dated Jan. 14, 2022, with English translation.
Office Action issued in corresponding Chinese Patent Application No. 202010127563.2 dated Jan. 28, 2022, with English translation.
Office Action issued in corresponding Chinese Patent Application No. 2020109475726 dated Feb. 11, 2022, with English translation.
Decision to Grant issued in corresponding Korean Patent Application No. 10-2020-7027742 dated Sep. 23, 2021, with English translation.
Extended European Search Report issued in corresponding European Patent Application No. 21 172 028.9-1208 dated Nov. 22, 2021.
Notice of Allowance issued in corresponding U.S. Appl. No. 16/695,761 dated Sep. 22, 2021.
Office Action issued in corresponding U.S. Appl. No. 17/082,096 dated Oct. 5, 2021.
Office Action issued in corresponding Japanese Patent Application No. 2020-104939; dated Mar. 15, 2022; 8 pages.
Office Action issued in corresponding Japanese Patent Application No. 2018-121752; dated Apr. 19, 2022;14 pages.
Decision to Grant issued in corresponding Korean Patent Application No. 10-2021-7006065; dated Mar. 29, 2022.
Decision to Grant issued in corresponding Korean Patent Application No. 10-2021-7013229; dated May 17, 2022.
Communication pursuant to Article 94(3) EPC issued in corresponding European Application No. 19 185 269.8 dated Apr. 30, 2021.
Communication pursuant to Article 94(3) EPC issued in corresponding European Application No. 19 185 282.1 dated Apr. 30, 2021.
Non-Final Office Action issued in corresponding U.S. Appl. No. 17/241,891 dated Jan. 21, 2022.
Final Office Action issued in corresponding U.S. Appl. No. 17/082,096 dated Jun. 8, 2022.
Notice of Allowance issued in corresponding U.S. Appl. No. 17/239,022 dated Jul. 21, 2022.
Notice of Issuance of corresponding Chinese Patent Application 2020109475726 dated Sep. 19, 2022.
Office Action issued in corresponding Korean Patent Application 10-2022-7012654 dated Sep. 27, 2022, with English translation.
Office Action issued in corresponding Japanese Patent Application 2021-172080 dated Sep. 7, 2022, with English translation.
Office Action issued in corresponding Japanese Patent Application 2021-155011 dated Sep. 27, 2022, with English translation.
Notice of Issuance issued in corresponding Korean Patent Application 10-2021-7031763 dated Oct. 31, 2022.
Office Action issued in corresponding U.S. Appl. No. 17/241,891 dated Oct. 27, 2022.
Notice of Allowance issued in corresponding U.S. Appl. No. 17/082,096 dated Nov. 15, 2022.
Office Action issued in corresponding Korean Patent Application 10-2021-7031763 dated Jul. 26, 2022, with English translation.
Office Action issued in corresponding Japanese Patent Application 2020-104959 dated May 17, 2022, with English translation.
Office Action issued in corresponding Korean Patent Application 10-2022-7012654 dated Jun. 8, 2022, with English translation.
Office Action issued in corresponding Japanese Patent Application 2020-185152 dated Nov. 29, 2022, with English translation.
Office Action (Decision to Grant a Patent) issued in corresponding Japanese Patent Application 2020-104959 dated Jan. 17, 2023, with English translation.

* cited by examiner

| nal_unit_header( ) { | Descriptor |
|---|---|
|    forbidden_zero_bit | f(1) |
|    nal_unit_type | u(6) |
|    nuh_layer_id | u(6) |
|    nuh_temporal_id_plus1 | u(3) |
| } | |

FIG 1

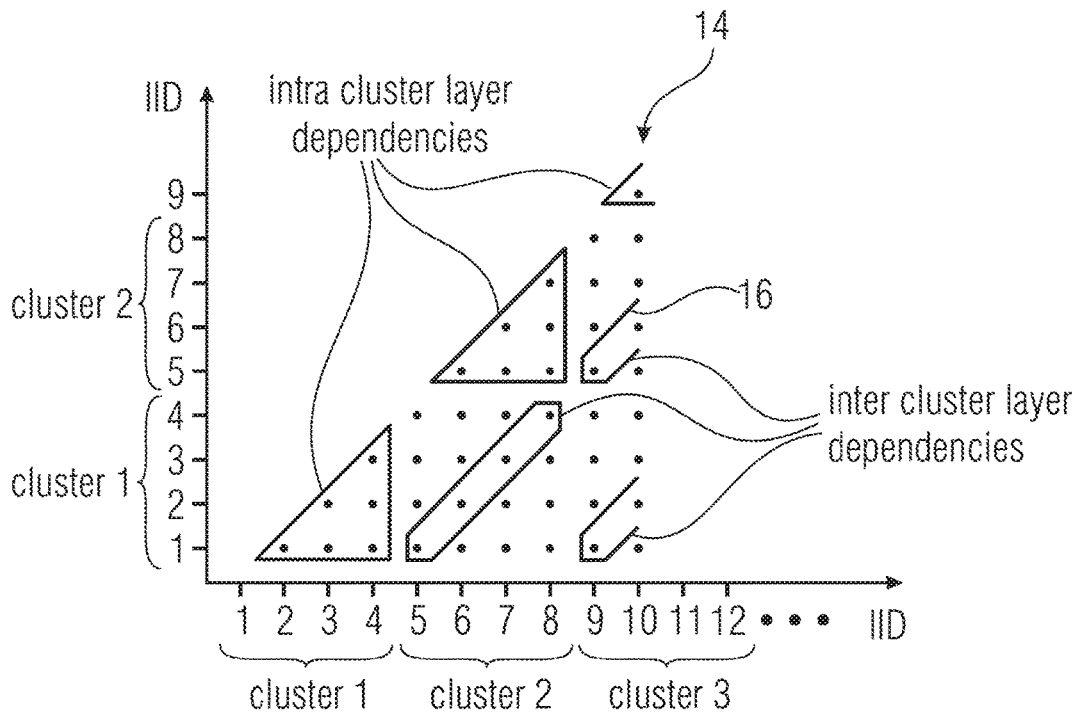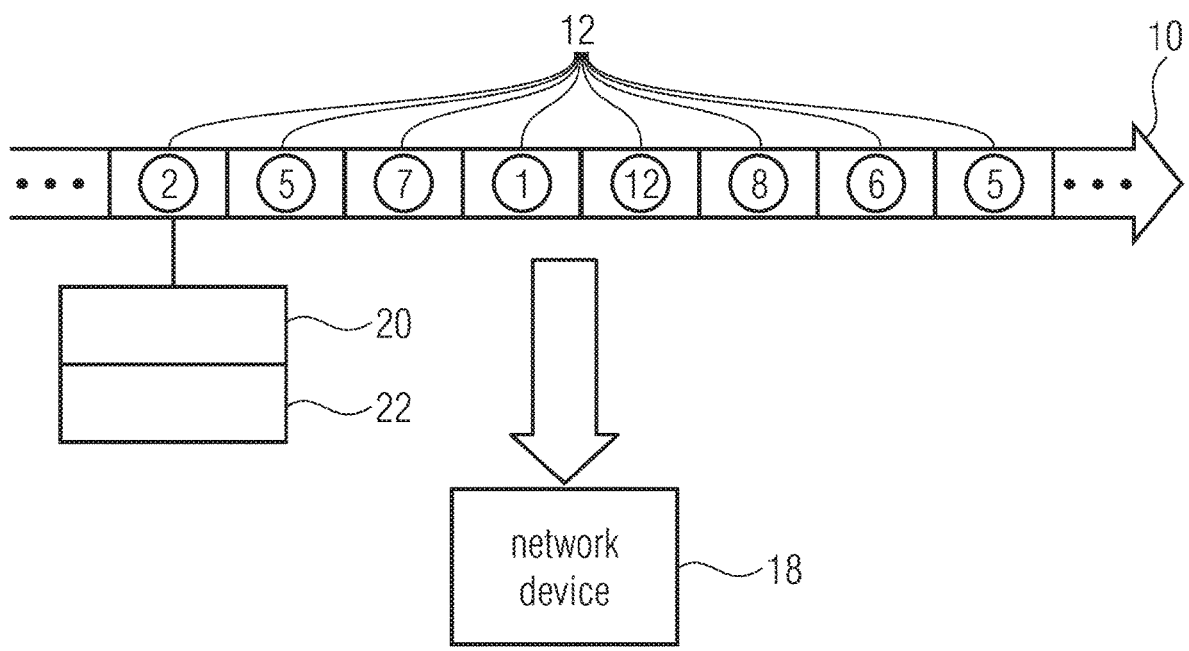
FIG 3

| vps_extension( ) { | Descriptor |
|---|---|
| ... | |
|    for( i = 1; i <= vps_max_layers_minus1; i++ ) | |
|      for( j = 0; j < i; j++ ) | |
|         direct_dependency_flag[ i ][ j ] | u(1) |
| | |
|    for( i = 1; i < ( 1 << layer_id_ext_len ) ; i++ ) | |
|      for( j = 0; j < i; j++ ) | |
|         direct_ext_dependency_flag[ i ][ j ] | u(1) |
| | |

FIG 6

| vps_extension( ) { | Descriptor |
|---|---|
| ... | |
|   for( i = 1; i <= vps_max_layers_minus1; i++ ) | |
|     for( j = 0; j < i; j++ ) | |
|       direct_dependency_flag[ i ][ j ] | u(1) |
|   unique_cluster_dependencies_flag | u(1) |
|   if ( !unique_cluster_dependencies_flag ) { | |
|     for( j = 1; j < max_layer_id_ext ; j++ ) | |
|       for( k = 0; k < j; k++ ) | |
|         general_direct_ext_dependency_flag[ j ][ k ] | u(1) |
|   } else { | |
|     for( i = 1; i <= vps_max_layers_minus1; i++ ) | |
|       for( j = 1; j < max_layer_id_ext; j++ ) | |
|         for( k = 0; k < j; k++ ) | |
|           direct_ext_dependency_flag[ i ][ j ][ k ] | u(1) |
|   } | |
| | |

FIG 7

| vps_extension( ) { | Descriptor |
|---|---|
| ... | |
|   for( i = 1; i <= vps_max_layers_minus1; i++ ) | |
|     for( j = 0; j < i; j++ ) | |
|       direct_dependency_flag[ i ][ j ] | u(1) |
|   cluster_dependency_sets_present_flag | u(1) |
|   if ( !cluster_dependency_sets_present_flag ) { | |
|     for( j = 1; j< max_layer_id_ext ; j++ ) | |
|       for( k = 0; k< j; k++ ) | |
|         general_direct_ext_dependency_flag[ j ][ k ] | u(1) |
|   } else { | |
|     number_of_cluster_dependency_sets | u(10) |
|     for( i = 1; i <= number_of_cluster_dependency_sets; i++) { | |
|       for( j = 1; j < max_layer_id_ext; j++ ) | |
|         for( k = 0; k < j; k++ ) | |
|           direct_ext_dependency_flag[ i ][ j ][ k ] | u(1) |
|       for( l = 1; l <= vps_max_layers_minus1; l++ ) | |
|         included_nuh_layer_id[ i ][ l ] | u(1) |
|     } | |
|   } | |

FIG 8

| | Descriptor |
|---|---|
| vps_extension( ) { | |
| ... | |
| for( i = 1; i <= vps_max_layers_minus1; i++ ) | |
| for( j = 0; j < i + ( layer_id_ext_len > 0 ? 1 : 0 ); i++ ) { | |
| direct_dependency_flag[ i ][ j ] | |
| if ( direct_dependency_flag[ i ][ j ] ) | |
| for( k = ( ( i == j ) ? 1 : 0 ); k < ( 1 << layer_id_ext_len ); k++ ) | |
| for( l = 0; l < ( ( ( i == j ) ? k : ( 1 << layer_id_ext_len ) ) ); l++ ) | |
| direct_ext_dependency_flag[ i ][ j ][ k ][ l ] | u(1) |
| } | |

FIG 9

| vps_extension( ) { | Descriptor |
|---|---|
| ... | |
|   for( i = 1; i <= vps_max_layers_minus1; i++ ) | |
|     for( j = 0; j < i + ( layer_id_ext_len > 0 ? 1 : 0); j++ ) | |
|       direct_dependency_flag[ i ][ j ] | u(1) |
|   number_of_cluster_dependency_sets | |
|   for( n = 0; n < number_of_cluster_dependency_sets; n++ ) { | |
|     for( j = 0; j < max_layer_id_ext; j++ ) | |
|       for( k = 0; k < max_layer_id_ext; k++ ) | |
|         direct_ext_dependency_flag[ n ][ j ][ k ] | u(1) |
|     for( i = 1; i <= vps_max_layers_minus1; i++ ) | |
|       for( j = 0; j < i + ( layer_id_ext_len > 0 ? 1 : 0); j++ ) | |
|         if( direct_dependency_flag[ i ][ j ] ) | |
|           dependency_set_applies_flag[ n ][ i ][ j ] | u(1) |
|   } | |

FIG 10

| slice_segment_header( ) { | Descriptor |
|---|---|
|     first_slice_segment_in_pic_flag | u(1) |
|     … | |
|     if( !dependent_slice_segment_flag ) { | |
|         if ( nuh_layer_id > 0 ) { | |
|             layer_id_ext | u(v) |
|         } | |
|         for( i = 0; i < (num_extra_slice_header_bits); i++ ) | |
|             slice_reserved_flag[ i ] | u(1) |
|     … | |
| } | |

FIG 13

| video_parameter_set_extension( ) { | Descriptor |
|---|---|
|     … | |
|     layer_id_ext_len | u(3) |
|     … | |
| } | |

FIG 14

| video_parameter_set_extension( ) { | Descriptor |
|---|---|
|     … | |
|     max_layer_id_ext | u(3) |
|     … | |
| } | |

FIG 15

| generic_sei_extension( ) { | Descriptor |
|---|---|
| ... | |
|     layer_id_ext | ue(v) |
| ... | |
| } | |

FIG 16A

| sps_extension( ) { | Descriptor |
|---|---|
| ... | |
|     layer_id_ext | ue(v) |
| ... | |
| } | |

FIG 16B

| pps_extension( ) { | Descriptor |
|---|---|
| ... | |
|     layer_id_ext | ue(v) |
| ... | |
| } | |

FIG 16C

| | Descriptor |
|---|---|
| vps_extension( ) { | |
| ... | |
|    Vps_nuh_layer_id_present_flag | u(1) |
|    for( i = 1; i <= VpsMaxNumLayers - 1; i++ ) { | |
|      if( vps_nuh_layer_id_present_flag ) | |
|        layer_id_in_nalu[ i ] | u(v) |
|      if( !splitting_flag ) | |
|        for( j = 0; j < NumScalabilityTypes; j++ ) | |
|          dimension_id[ i ][ j ] | u(v) |
|    } | |
|    for( i = 1; i <= VpsMaxNumLayers - 1; i++ ) | |
|      for( j = 0; j < i; j++ ) | |
|        direct_dependency_flag[ i ][ j ] | u(1) |
|    for( i = 0; i< VpsMaxNumLayers - 1; i++ ) | |
|      max_tid_il_ref_pics_plus1[ i ] | u(3) |
|    vps_number_layer_sets_minus1 | u(10) |
|    vps_num_profile_tier_level_minus1 | u(6) |
|    for( i = 1; i <= VpsMaxNumLayers - 1; i++ ) { | |
|      vps_profile_present_flag[ i ] | u(1) |
|      if( !vps_profile_present_flag[ i ] ) | |
|        profile_ref_minus1[ i ] | u(6) |
|      profile_tier_level(vps_profile_present_flag[i], vps_max_sub_layers_minus1) | |
|    } | |
| ... | |
|    direct_dep_type_len_minus2 | ue(v) |
|    for( i = 1; i <= VpsMaxNumLayers - 1; i++ ) | |
|      for( j = 0; j < i; j++ ) | |
|        if( direct_dependency_flag[ i ][ j ] ) | |
|          direct_dependency_type[ i ][ j ] | u(v) |
| ... | |
| } | |

FIG 17

| slice_segment_header( ) { | Descriptor |
|---|---|
|     first_slice_segment_in_pic_flag | u(1) |
|     ... | |
|     if( !dependent_slice_segment_flag ) { | |
|         if ( nuh_layer_id & > 0 ) { | |
|             layer_id_ext | u(v) |
|         } | |
|         for( i = 0; i < (num_extra_slice_header_bits); i++ ) | |
|             slice_reserved_flag[ i ] | u(1) |
|     ... | |
| } | |

FIG 19

| video_parameter_set_extension( ) { | Descriptor |
|---|---|
| ... | |
|    add_layer_id_ext_len | u(3) |
| ... | |
| } | |

FIG 20A

| slice_segment_header( ) { | Descriptor |
|---|---|
|    first_slice_segment_in_pic_flag | u(1) |
| ... | |
|    if( !dependent_slice_segment_flag ) { | |
|      maxLayerIdExtOffset = (1 << add_layer_id_ext_len ) - 1 | |
|      layerIdExtOffset = nuh_layer_id & maxLayerIdExtOffset | |
|      if ( layerIdExtOffset = = maxLayerIdExtOffset ) { | |
|        layer_id_ext | u(v) |
|      } | |
|      for( i = 0; i < (num_extra_slice_header_bits); i++ ) | |
|        slice_reserved_flag[ i ] | u(1) |
| ... | |
| } | |

FIG 20B

LAYER CHARACTERISTIC SIGNALING IN MULTI-LAYERED CODING

CROSS REFERENCE TO RELATED APPLICATIONS

The present application is a continuation of U.S. patent application Ser. No. 16/738,075 filed Jan. 9, 2020, which is a continuation of U.S. patent application Ser. No. 14/995,244 filed Jan. 14, 2016, which is a continuation of International Application No. PCT/EP2014/065182, filed Jul. 15, 2014, and additionally claims priority from U.S. Provisional Application 61/846,479, filed Jul. 15, 2013, which are incorporated herein by reference in their entireties.

The present application is concerned with layer characteristic signaling in multi-layered coding such as, for example, in the field of multi-layered video coding.

BACKGROUND OF THE INVENTION

Video codecs specifications such as the HEVC base specification [1] and its extensions such as the multi-view extension [2] [3] usually inherit mechanisms to signal the layer to which each coded chunk of video data belongs to in a layered coding scenario. The signaling mechanism needs to be readily available, cp. the layer identifier in den NAL unit header (nuh_layer_id) in HEVC as given in the table in FIG. 1.

With its finite size in terms of bits, the respective HEVC syntax element allows for 64 values to be used to identify scalable layers, views and/or depth. For multi-view video using the current HEVC NAL unit header syntax, this for example implies a constraint of 64 views or 32 view plus depth combinations as maximum. While this is sufficient for many common stereo view scenarios and other applications, huge camera arrays with more than 100 views for applications like light field imaging [4], [5] or holographic displays [6] may use an extendable mechanism for signaling a larger space of layer identifiers.

Furthermore, structuring the space of layer identifiers by grouping certain layers or views with respect to their coding dependencies or spatial relation to each other may be of benefit. Further, providing a compact representation of the coding dependencies in the structured layer identifier space is also of benefit as deriving such information from already available information within the coded video bitstream may involve intolerable computational resources.

SUMMARY

According to an embodiment, a device may have: a receiver configured to receive a multi-layered video signal composed of a sequence of packets each of which includes a layer identification syntax element structure composed of a base layer-ID field and an extension layer-ID field; a layer identification extender configured to read, for a predetermined portion of the multi-layered video signal including a plurality of packets, a maximum syntax element from the multi-layered video signal, indicating a maximally assumed value of the extension layer-ID field of the packets included in the predetermined portion of the multi-layered video signal, for each of the packets within the predetermined portion of the multi-layered video signal, determine the layer ID for the respective packet based on the layer identification syntax element structure, determine a maximum number of layers within the predetermined portion of the multi-layered video signal based on the maximally assumed value, and determine at least one characteristic for each of the maximum number of layers by iteratively parsing a layer characterizing syntax portion of the multi-layered video signal a number of times equal to the maximum number of layers, wherein the device is configured to acquire a bit length of the extension layer-ID field from an explicit signaling in the bit stream, wherein the maximum syntax element indicates the maximally assumed value of the extension layer-ID field in units smaller than the bit length of the extension layer-ID field minus one to the power of two.

According to another embodiment, a method may have the steps of: receiving a multi-layered video signal composed of a sequence of packets each of which includes a layer identification syntax element structure composed of a base layer-ID field and an extension layer-ID field; reading, for a predetermined portion of the multi-layered video signal including a plurality of packets, a maximum syntax element from the multi-layered video signal, indicating a maximally assumed value of the extension layer-ID field of the packets included in the predetermined portion of the multi-layered video signal, for each of the packets within the predetermined portion of the multi-layered video signal, determining the layer ID for the respective packet based on the layer identification syntax element structure, determining a maximum number of layers within the predetermined portion of the multi-layered video signal based on the maximally assumed value, and determining at least one characteristic for each of the maximum number of layers by iteratively parsing a layer characterizing syntax portion of the multi-layered video signal a number of times equal to the maximum number of layers, wherein a bit length of the extension layer-ID field is acquired from an explicit signaling in the bit stream, wherein the maximum syntax element indicates the maximally assumed value of the extension layer-ID field in units smaller than the bit length of the extension layer-ID field minus one to the power of two.

According to another embodiment, an encoder for encoding a video signal into a multi-layered video signal composed of a sequence of packets each of which includes a layer identification syntax element structure composed of a base layer-ID field and an extension layer-ID field may be configured to insert, for a predetermined portion of the multi-layered video signal including a plurality of packets, a maximum syntax element into the multi-layered video signal, indicating a maximally assumed value of the extension layer-ID field of the packets included in the predetermined portion of the multi-layered video signal, determine a maximum number of layers within the predetermined portion of the multi-layered video signal based on the maximally assumed value, and signal at least one characteristic for each of the maximum number of layers in the multi-layered video signal by iteratively writing a layer characterizing syntax portion of the multi-layered video signal a number of times equal to the maximum number of layers, wherein the encoder is configured to provide the bit stream an explicit signaling from which a bit length of the extension layer-ID field can be acquired, wherein the maximum syntax element indicates the maximally assumed value of the extension layer-ID field in units smaller than the bit length of the extension layer-ID field minus one to the power of two.

According to another embodiment, a method for encoding a video signal into a multi-layered video signal composed of a sequence of packets each of which includes a layer identification syntax element structure composed of a base layer-ID field and an extension layer-ID field may have the steps of: inserting, for a predetermined portion of the multi-layered video signal including a plurality of packets, a maximum syntax element into the multi-layered video signal, indicating a maximally assumed value of the extension layer-ID field of the packets included in the predetermined portion of the multi-layered video signal, determining a maximum number of layers within the predetermined portion of the multi-layered video signal based on the maximally assumed value, and signaling at least one characteristic for each of the maximum number of layers in the multi-layered video signal by iteratively writing a layer characterizing syntax portion of the multi-layered video signal a number of times equal to the maximum number of layers, said method having the step of: providing the bit stream with an explicit signaling from which a bit length of the extension layer-ID field can be acquired, wherein the maximum syntax element indicates the maximally assumed value of the extension layer-ID field in units smaller than the bit length of the extension layer-ID field minus one to the power of two.

According to another embodiment, a non-transitory digital storage medium may have computer-readable code stored thereon to perform, when said storage medium is run by a computer, the inventive methods.

One aspect of the present application is concerned with the signaling of at least one characteristic for layers of a multi-layered video signal such as, for example, for each layer the indication of dependent layers to which the respective layer directly relates via inter-layer prediction, or the signaling of the afore-mentioned second inter-dependency syntax structure. In accordance with this aspect, a maximum syntax element is signaled within the multi-layered video signal to indicate a maximally used value of an extension layer-ID field of the packets of the multi-layered video signal, the scope of the maximum syntax element being, for example, a predetermined portion of the multi-layered video signal extending, for example, across several portions of the multi-layered video signal. Accordingly, according to this aspect it is feasible for devices such as decoders or network elements receiving the multi-layered video signal to gain, for a relatively large predetermined portion of the multi-layered video signal, knowledge about the actually consumed portion of the possible domain of possible values signalizable by the extension layer-ID field and the at least one characteristic does not need to be signaled for each combination of base layer-ID field value and extension layer-ID field value, but rather it is sufficient to signal the at least one characteristic for a maximum number of layers determined based on the maximum assumed value. Accordingly, the at least one characteristic does not need to be transmitted/signalized for layers with a layer ID, the extension layer-ID of which does not occur within the predetermined portion of the multi-layered video signal. Beyond this, in accordance with a further embodiment, the knowledge of the maximally assumed value may be used to reduce the side information overhead for signaling the layer-ID of each portion, i.e. for reducing the bits needed to signal the extension layer-ID field within the multi-layered video signal's packets.

One of the aspects of the present application is concerned with the signalization of the inter-layer dependencies between layers of a multi-layered data stream. According to this aspect, a good compromise between a too intensive restriction of the potential diversity of inter-layer dependencies on the one hand and a too complex signaling of the inter-layer dependencies on the other hand has been found by describing the inter-layer dependencies by way of a first inter-dependency syntax structure indicating inter-dependencies between pairs of different values representable by a base layer-ID and a second inter-dependency syntax structure indicating inter-dependencies between pairs of different values representable by an extension layer-ID, the base layer ID and extension layer ID indexing the layers the portions of the multi-layer data stream are associated with. In accordance with this concept, emphasis may be shifted between increased diversity of the signalizable inter-layer dependencies on the one hand and reduced side-information overhead for signaling the inter-layer dependencies on the other hand: for example, calling the sets of layers having a common base-layer ID, respectively, "clusters", the same second inter-dependency syntax structure may be used to regulate the inter-dependencies within all clusters and between all clusters related to each other via the first inter-dependency syntax structure, separately. Alternatively, two instantiations of the second inter-dependency syntax structure may be used to describe the inter-dependencies of the layers within the clusters on the one hand and between the layers of different clusters, on the other hand. Irrespective of the emphasis placed towards increased diversity or reduced side information overhead, the inter-dependency signaling concept results in keeping the signaling overhead low.

One of the aspects of the present application is concerned with the signaling of the layer ID which each of the packets of a multi-layered video signal is associated with. In particular, this aspect achieves an efficient way of signaling this layer association, nevertheless maintaining the backward compatibility with codecs according to which a certain value of the base layer-ID field is restricted to be non-extendable such as base layer-ID value 0 in the base layer-ID field. Instead of circumventing this restriction specifically with respect to this non-extendable base layer-ID value, the layer-ID of portions of the multi-layer data stream is signaled in an extendable manner by sub-dividing the base layer-ID field into a first sub-field and a second sub-field: whenever the first sub-field of the base layer-ID field fulfills a predetermined criterion, an extension layer-ID field is provided, and if the first sub-field of the base layer-ID field does not fulfill the predetermined criterion, the extension layer-ID field is omitted. The aforementioned non-extendable base layer-ID value is "hidden" within the group of base layer-ID values for which the first sub-field of the base layer-ID field does not fulfill the predetermined criterion, and accordingly this non-extendable base layer-ID value is not handled separately, but rendered part of the former group. Rather, if the first sub-field of the base layer-ID field fulfills the predetermined criterion, an extension value is derived from the extension layer-ID field signaled within the multi-layer data stream such that same lies within a first subset of a domain of extension values, and if the first sub-field of the base layer-ID field does not fulfill the predetermined criterion, this extension value is set to a value disjoint to the first subset of the domain of extension values. The layer which a respective portion is associated with is then indexed using the extension value as well as the cluster value which is derived from a second sub-field of the base layer-ID field. All in all, no signaling efficiency has been lost despite the maintenance of the backward compatibility.

BRIEF DESCRIPTION OF THE DRAWINGS

Embodiments of the present invention will be detailed subsequently referring to the appended drawings, in which:

FIG. 1 shows the syntax of an NAL unit header in HEVC;

FIG. 3 schematically shows a network device and a concept of signaling in a cluster-wise manner layer interdependencies within the multi-layered data stream arriving at the network device;

FIG. 6 shows a possible extension of the HEVC syntax of a slice segment header by showing a portion of the same extended by way of a syntax element indicating a layer-ID extension;

FIG. 7 shows an example for a VPS syntax exemplarily extended so as to implement the signaling concept of FIG. 3;

FIGS. 8 to 10 show alternatives of the example of FIG. 7;

FIG. 13 shows an example of a portion out of a slice segment header of HEVC extended so as to include an extension layer-ID field FIG. 14 shows an example of a VPS syntax extended so as to include a syntax element so as to indicate the length of the extension layer-ID field of FIG. 13;

FIG. 15 shows an example of a VPS syntax extended so as to include a syntax element indicating the maximum value of the extension layer-ID field;

FIGS. 16a to 16c show examples of portions out of syntax structures of an SEI extension, SPS syntax or PPS syntax, extended so as to include an extension layer-ID field;

FIG. 17 shows an example of a VPS syntax signaling information on layers within the video data stream with cycling through syntax portions thereof a number of times depending on the maximally assumed value explained with respect to FIGS. 11 and 12;

FIG. 19 shows an example of a portion out of a slice segment header, extended so as to comprise an extension layer-ID field;

FIG. 20a shows an example of a VPS syntax extended so as to comprise a syntax element indicating a length of a subfield of the base layer-ID field;

FIG. 20b shows an example for a portion out a slice segment header syntax, modified so as to conditionally explicitly signal an extension layer-ID field.

DETAILED DESCRIPTION OF THE INVENTION

Before describing certain embodiments of the present application, an exemplary multi-layered video codec environment is described with respect to FIG. 2, in which the below-outlined embodiment and aspects may advantageously be used. Although this overview of an exemplary multi-layered video codec environment is not to be understood as restricting the embodiment outlined further below, the details and functionalities exemplarily provided with respect to the following figures shall be treated as describing a reservoir of possible extensions of the embodiments further outlined below so as to result in more detailed embodiments. In any case, the illustrative multi-layered video codec environment presented hereinafter renders the understanding of advantages of the below-outlined embodiment easier.

Figure 2:
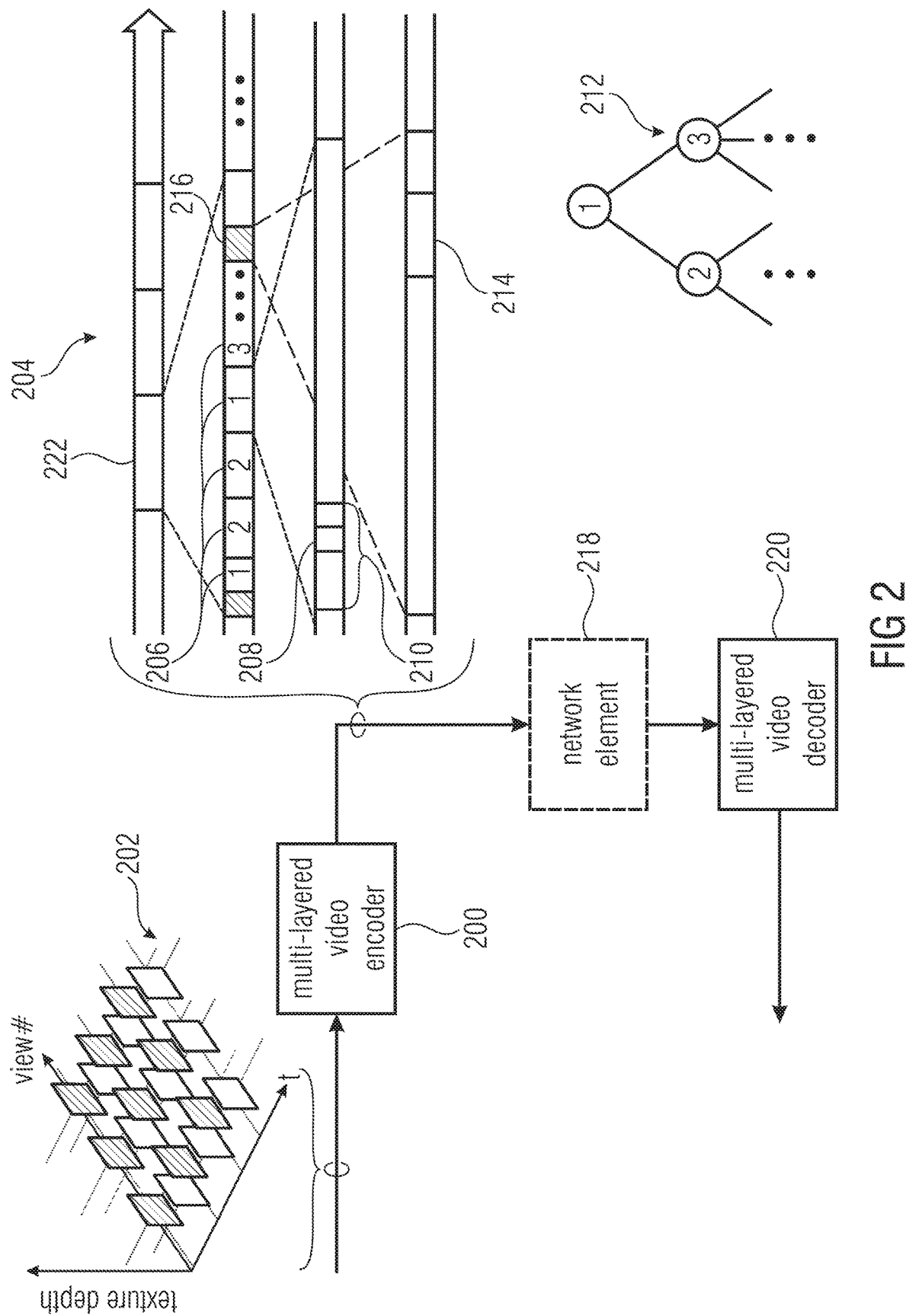
FIG. 2 schematically illustrates an environment comprising a multi-layered video encoder, a network element and a multi-layered video decoder, wherein a multi-layered video encoder, network element and multi-layered video decoder may be improved by any of, or any combination of, the concepts described in the following figures.

FIG. 2 shows illustratively a multi-layered video encoder 200 which receives at its input a video material 202. For illustrative purposes only, the video material 202 is illustrated as a multi-view video signal conveying video data for each of a plurality of views such as texture and depth for each picture of the video. Generally speaking, the video material 202 may represent a multi-dimensional sampling of one scene. One dimension might be time t. That is, the video material 202 temporally samples this scene, thereby resulting in one picture per time instant. Moreover, this scene may have been captured from different viewpoints, thereby resulting in one video per view or in one picture per view for each time instant. Further, the video material 202 may provide for each view, or each subset of the views, in addition to the spatial sampling of the texture of the scene, i.e. the spatial sampling of the colors of the scene, a depth map of the scene—for the respective view. FIG. 2, for example, differentiates between depth maps, which are illustrated using hatching, and texture maps or images, which are drawn non-hatched. However, it should be noted that none of the embodiments outlined further below are restricted to such multi-view materials. Rather, the illustration in FIG. 2 has only been provided for the sake of alleviating the description brought forward below.

The multi-layered video encoder 200 is configured to encode the video material 202 into a multi-layered data stream or video signal 204. In particular, multi-layered video encoder 200 codes the video material into the multi-layer data stream 204 at different layers, corresponding to different levels of information amount, using inter-layer prediction. This means the following. The multi-layered video encoder 200 generates the multi-layered data stream such that same comprises a plurality of packets 206, each of which is associated with one of different layers. The multi-layered video encoder 200 encodes, for example, into packets 206 of a certain base layer some base level of information amount of the video material 202 such as, for example, merely the texture of one view or the like. The association of the packets 206 to any of the various layers is, for example, derivable from a layer identification syntax element structure 208 within each packet 206, wherein the layer identification syntax element structure 208 may, for example, be contained within a header 210 of the respective packet 206. For example, for illustration purposes, numbers 1, 2 and 3 are shown to be inscribed into packets 206, thereby illustrating layers with layer-ID 1, 2 and 3, respectively. Among these layers, the layer with layer-ID 1 may, for example, form the lowest or base layer providing the base level of information amount. Packets 206 of other layers may increase the information amount available on the packets 206 of the base layer only in terms of one or more or various information types. For example, packets 206 of a certain layer may have a further view encoded therein in addition to the views already coded within the base or reference layer's packets 206. Alternatively, packets 206 of a certain layer may have depth information on a scene of the video material 202, such as depth information of a view, the texture of which has already been encoded into the packets of the base or—more generally—reference layer which may any lower layer. Likewise, surface reflectance information may be coded into the packets of a further layer, i.e. a spatial sampling of the scene with respect to the surface reflectance of the objects within that scene irrespective of the illumination circumstances. And even further, alpha blending information may be coded into the packets of a further layer, i.e. a spatial sampling of the transparency of the scene points corresponding to the individual picture samples. Packets 206 of a certain layer may also add at a certain color component information or may increase the spatial resolution, i.e. provide spatial resolution refinement. Similarly, packets 206 of a certain layer may simply provide an SNR resolution refinement, i.e. increase the signal to noise ratio of the coded video material. In order to avoid redundancy within the multi-layered data stream 204 as far as the various layers are concerned, inter-layer prediction is used by multi-layered video encoder 200: that is, packets 206 of a certain layer have encoded therein a prediction residual with respect to an inter-layer prediction as obtained from one or more other layers, called reference layers with respect to the former layer. The inter-layer prediction may be applied to different entities such as syntax elements and parameters describing the video material 202. For example, the prediction residual conveyed by packets 206 of a certain layer may correct the inter-layer prediction as obtained from the one or more reference layers in the spatial domain on a per pixel basis. Alternatively, the multi-layered video encoder 200 may, for example, use transform residual coding and the inter-layer prediction correction may take place in the transform domain, such as DCT domain on a per transform coefficient basis, for example. Alternatively or additionally, the multi-layered video encoder 200 may be of a hybrid video codec type using spatial and/or temporal prediction and the inter-layer prediction may, for example, additionally or alternatively pertain to a refinement of motion vectors. Even further, the multi-layered video encoder 200 may use hierarchical multi-tree subdivision in order to subdivide the pictures of video material 202 into coding blocks in units of which different prediction modes are applied, such as spatial and temporal prediction, transform blocks in units of which the aforementioned transform is performed on the prediction residual, and/or other blocks in units of which certain coding parameters are set for coding the video material 202 and instead of signaling subdivision information for a further layer anew, the subdivisioning may either be adopted completely from any of the one or more base layers, or a refinement with respect to that subdivision information may be signaled.

By way of the inter-layer dependencies among the layers, the layers of multi-layer video signal 204 are interrelated with each other via branches of a tree 212, the nodes of which are formed by the aforementioned layers. In order to convey information about the inter-layer dependencies among the layers, i.e. render information on the inter-dependency tree 212 available at the decoding side, the multi-layered video signal 204 may have information thereon coded thereinto.

In FIG. 2, for example, it is illustrated that multi-layered video encoder 200 intersperses into the video data stream 204 high-level syntax packets 216 which comprise or convey information 214. Information 214 may comprise an inter-dependency syntax structure so as to describe the inter-layer dependencies in tree 212.

However, the information on the tree 212 may, alternatively, be known or reconstructible by default at encoder and decoder. Accordingly, additionally or alternatively, the layer-related information 214 may comprise information related to some layer-ID extension mechanism. In particular, while for many applications a moderate number of layers is sufficient in order to form the multi-layered video signal 204, some other applications may suffer from a too small number of layers signalizable by the layer identification syntax element structure 208. In other words, constructing the layer identification syntax element structure 208 such that same would also accommodate the huge number of layers for those applications which involve such a high number of layers, would disadvantageously result in a high side information overhead when considering the overall multiplicity of applications, and construing the layer identification syntax element 208 so that same merely accommodates the moderate number of layers would exclude the other applications from being sufficiently supported by the multi-layered video codec underlying data stream 204. Accordingly, some extension mechanism may be used in order to be able to switch between modes of the data stream 204, where the layer identification syntax element structure 208 accommodates merely the lower moderate number of layers, and a mode where the layer identification syntax element structure even accommodates the high number of layers and information 214 may additionally or alternatively participate in the switching between these modes.

While the scope of validity of the high level syntax packet 216 may encompass the whole multi-layered video signal 204, it is also possible that the predetermined portions to which packets 216 belong may be smaller, such as, for example, they may relate to chunks into which the multi-layered video signal 204 is temporally segmented, each chunk being a sequence of pictures. For example, using DASH or another adapted streaming protocol, multi-layered video encoder 200 may change the number of layers coded into bitstream 204 in units of the just mentioned predetermined portions, the inter-layer dependency in the form of tree structure 212 and/or the switching between extension or non-extension with respect to the layer identification syntax element structure 208. In any case, periodically transmitting the high level syntax packets 216 enables recipients to, on a random access basis, be able to have multiple random access time instances to start decoding multi-layered video signal 214 inbetween.

FIG. 2 also shows exemplarily devices for receiving the multi-layered data stream. An optional network element 218, for example, receives the multi-layered video data stream 204 and processes same in order to forward it to a recipient of the multi-layered video data stream 204. Accordingly, FIG. 2 also shows a multi-layered video decoder 220 configured to decode the multi-layered video data stream 204. Both entities, i.e. network element 218 and multi-layered video decoder 220 form examples for devices for processing the multi-layered data stream 204.

The network element 218 does not need to be able to decode the multi-layered data stream 204 using the inter-layer prediction between the various layers thereof. Despite this, both network element 218 and multi-layered video decoder 220, i.e. the recipient, need to be informed of the packets 206 association with the various layers and the inter-layer dependencies thereamong as defined by tree 21. Network element 218 discards, for example, packets 206 of data stream 204 associated with layers where the additional information amount provided is, for example, preliminarily not needed within the further link between network element 218 and multi-layered video decoder 220, respectively, for example, due to bitrate shortcomings within the link, the recipient's inability to reproduce the additional information amount or the like. Similarly, multi-layered video decoder 220 may also decide to discard some of the packets 206 of certain layers responsive to external parameters such as a currently available computation power, a reproduction device's display performance such as spatial resolution, maximum number of input views or the like. That is, the device 218/220 is able to read the layer identification syntax element structure 208 of packets 206 and, if present, to derive the inter-layer dependencies among the layers from information 214, and/or to switch between the extension mode or non-extension mode with respect to the layer identification syntax element structure 208 responsive to the information 214 and/or to read other characteristics with respect to the layers from information 214.

Beyond that, the multi-layered video decoder 220 is able to reconstruct the video material 202 from the inbound data stream 204 up to a certain level by collecting and using the information of packets 206 associated with that layer and all layers to which this layer is interrelated by the inter-prediction dependencies (see the tree structure 212). That is, as outlined above multi-layered video decoder 220 may use packets 206 of a certain layer as a prediction residual with respect to an inter-layer prediction which the multi-layered video decoder 220 derives from the packets 206 of the one or more reference layers of that layer. In this regard, multi-layered video decoder 220 may, as outlined above, be a decoder using transform residual decoding, hybrid video decoding, hierarchical multi-tree subdivisioning and/or other coding concepts.

For the sake of completeness only, FIG. 2 shows that multi-layered video encoder 200 and data stream 204 may exemplarily be provided such that packets 206 are included within data stream 204 in such a manner that packets 206 belonging to different time instances or pictures are not interleaved with each other so as to form, per time instant, consecutive access units 222, each collecting the packets 206 belonging to the respective time instant of that access unit 222 so that packets 206 belonging to any other time instant are within the data stream 204 either before or subsequent to this access unit 222. However, it should be noted that this restriction has been chosen merely for illustration purposes and a more relaxed arrangement of the packets 206 within data stream 204 may alternatively be chosen.

In the following, a possibility of signaling the inter-layer dependencies according to tree structure 212 is described in more detail. As mentioned above, this signaling may be comprised by the information 214. In accordance with this possibility, the layers are grouped into clusters. Within the data stream, the inter-layer dependencies among the clusters on the one hand and the layers within the clusters on the other hand are separately signaled. Insofar, the description brought forward below represents a possibility of implementing the information 214 of FIG. 2 in order to signal the inter-layer dependencies 212, but as already noted above, the details described hereinafter with respect to FIG. 3 should not be restricted to the details set out in FIG. 2. Rather, FIG. 2 should be seen as a possible implementation reservoir for the description with respect to FIG. 3.

FIG. 3 illustrates a network device 18, which may be the network element 218 or the multi-layered video decoder 220 of FIG. 2, and a multi-layered data stream 10 same is configured to process, such as data stream 204 of FIG. 2.

FIG. 3 illustrates multi-layer data stream 10 as having coded thereinto a video material at different layers identified by layer-ID IID. Each layer corresponds to a different level of information amount. Possibilities in this regard have already been discussed with respect to FIG. 2, but for the sake of an easier understanding one could think of each layer adding a certain view to data stream 10. However, this is not meant to be restrictive for the description of FIG. 3. Each layer may, alternatively, correspond to a combination of different measures for the information amount, such as, for example, a number of views and spatial resolution or the like.

The multi-layer data stream 10 is thus composed of a plurality of packets 12 which may, exemplarily, correspond to packets 206 of FIG. 2. Such packets 12 (or 206) may be substreams allowing, for example, wavefront parallel processing of the individual pictures coded into video signal 10, which substreams may, in turn, be composed of smaller units such as NAL units, slices or the like. However, it is submitted herewith that packets 12 or packets 206 of FIGS. 2 and 3 may also be NAL units, slices or other units.

Each packet 12 is associated with one of the different layers and in order to reduce the bit consumption of the multi-layer data stream 10, inter-layer prediction is used so that each packet 12 merely adds a "residual" to packets of a certain subset of lower layers of the data stream 10. As shown at 14, the "lower layers" are, for each layer, illustrated by small dots.

In accordance with the embodiment shown in the FIG. 3, the inter-layer prediction dependencies may be restricted as described in more detail below and illustrated in the figure using continuous lines 16. In particular, the layer-ID is formed by a concatenation of two values as described in the following. In particular, the network device, which receives the multi-layer data stream 10, reads, per packet 12, a layer-ID syntax structure indicated using reference sign 208 in FIG. 2, but here composed of a base layer-ID field 20 and, on a conditional basis,—conditionally depending on the base layer-ID field or a high-level syntax element switching on and off extension mechanism, for example—an extension layer-ID field 22. Exemplarily, merely packets 12 having both fields are shown in the figure. But, as described above, one or more values of the base layer-ID field 20 may signal the absence of field 22 for the respective packet 12. For example, the whole extension functionality could be switchable on/off in the data stream via an extension flag in the data stream, and possible conditions for necessitating or not necessitating the extension layer-ID field could be that, as described above, the base layer-ID field is zero, is or has a certain bit set or not set, or assumes a certain value within a sub-portion of field 20, or base layer-ID field having a value greater than, or smaller than some value. Further examples are set out below.

Based on the layer-ID syntax structure 20 and 22, the network device 18 derives the layer-ID identifying the layer the respective packet 12 is associated with, i.e. IID. Different possibilities will be described below. The network device 18 also reads, from the multi-layered data stream 10, a first inter-dependency syntax structure containing, for example, the above-identified direct_dependency_flags, and a second inter-dependency syntax structure containing, for example, the below denoted direct_ext_dependency_flag and/or general_direct_ext_dependency_flags. The first inter-dependency syntax structure indicates, in a binary manner, inter-dependencies between pairs of different values representable by the base layer-ID field 20, whereas the second inter-dependency syntax structure indicates, in the binary manner, inter-dependencies between pairs of different values representable by the extension layer-ID field. Based on both inter-dependency syntax structures, the network device 18 then forms an inter-layer dependency matrix revealing inter-layer prediction dependencies between different layers, such as the one depicted at 14 in the figure. The way the derivation may be done is illustrated in the following using a pseudo code using for-next loops involving the first and second inter-dependency syntax structures and is explained with respect to the following figures, too. It should be noted, however, that signaled inter-layer prediction dependencies need not to be actually used in the data stream. Rather, the signaling of possible inter-layer prediction dependencies is for instructing the decoder or other network devices to take the steps resulting in that the interrelated packets are available in the appropriate order, i.e. the packets referred to by other packets according to the inter-layer prediction dependencies prior to the referring packets.

As will get clear from the description below, the construction of the inter-layer dependency matrix 14 may be performed such that the second inter-dependency syntax structure is applied to all instances where the inter-layer dependency matrix 14 relates to inter-layer prediction dependencies between layers of layer-ID having been derived from, and thus being associated with, the same value within the base layer-ID field 20. In accordance with another embodiment also described below in more detail, the second inter-dependency syntax structure is read from and is transmitted within the bitstream 10 several times such as, for example, for each possible value of the base layer-ID field 20 individually or for subsets of possible values of the base layer-ID field 20, while associating the various instantiations of the second inter-dependency syntax structure to the possible values of the base layer-ID field 20 using indexing, for example, such as using included nuh_layer_id in the below presented example. In even other embodiments the structure is generalized in that all possible inter-layer prediction dependencies are allowed and describable by way of the second inter-dependency syntax structure, namely by transmitting same per pair of different values of the base layer-ID field for which the first inter-dependency syntax structure indicates inter-dependency existence.

Figure 4:
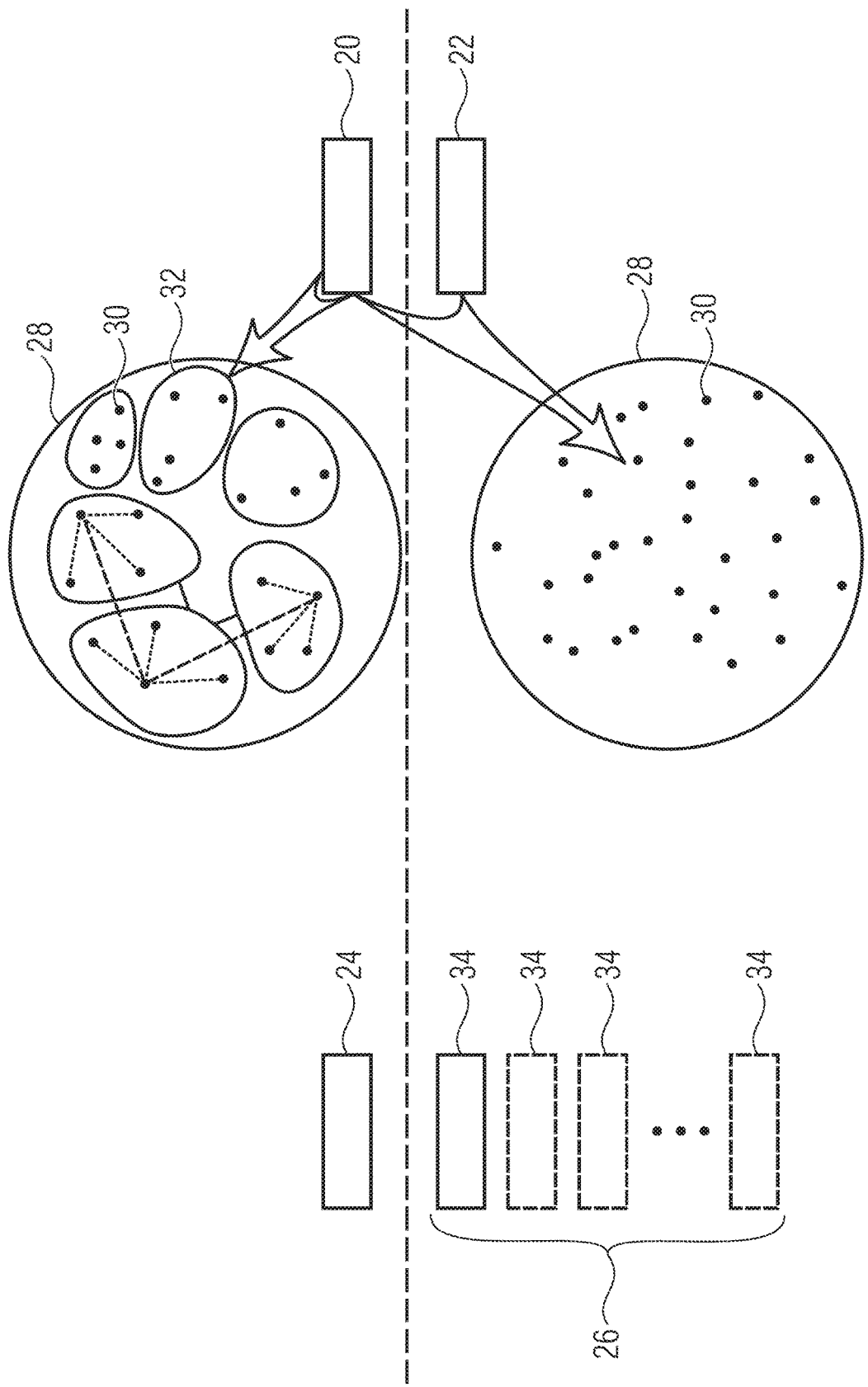
FIG. 4 schematically illustrates the way of signaling the inter-layer dependencies in accordance with the concept of FIG. 3.

In other words, and as further illustrated in FIG. 4, FIG. 3 presented an example for signaling the inter-layer dependencies according to which separate inter-dependency syntax structures 24 and 26 were used to describe the inter-layer dependencies in an hierarchical manner with the interface between the scope of both inter-dependency syntax structures 24 and 26 coinciding with the interface between the scope of the base layer-ID and extension layer-ID provided by fields 20 and 22 within each packet of the data stream. Base layer-ID and extension layer-ID as provided by fields 20 and 22 uniquely define the layer-ID of the respective packet by which fields 20 and 22 are comprised. The set of all representable layer-IDs representable by the combination of extension layer-ID and base layer-ID are indicated within circle 28 by dots 30. That is, each dot 30 corresponds to a different couple of base layer-ID and extension layer-ID. For example, the layer-ID may be the concatenation of base-layer ID and extension layer-ID. Using the base layer-ID as provided by field 20 only, the complete set 28 of layer-IDs 30 are subdivided into disjoint sets 32 of layer-IDs called clusters 32 in the following, wherein all layer-IDs belonging to a certain cluster 32 have the same base layer-ID. As described previously with respect to FIG. 2, the layers associated with layer-IDs 30 are linked to each other in a tree-like manner due to inter-layer prediction with these inter-layer dependencies being illustrated in FIG. 4 using dashed lines between dots 30. For the ease of understanding, only a subset of the actual inter-layer dependencies are illustrated in FIG. 4.

In any case, the linking between two clusters 32 by way of an inter-layer dependency between a layer of the first cluster 32 and a layer of the second cluster 32 of this pair is indicated by way of the first inter-dependency syntax structure 24. In other words, the first inter-dependency syntax structure 24 describes, coarsely or cluster-wise, the inter-dependencies between layers. In FIG. 4, these inter-dependencies are illustrated using continuous lines between clusters 32. All pairs of a first and a second cluster 32 wherein at least one layer of the first cluster is linked to one cluster in the second cluster are interlinked and so indicated in the first inter-dependency syntax structure 24. The second inter-dependency syntax structure 26 then clarifies which of the layers of pairs of clusters 32 indicated as being interlinked by the first inter-dependency syntax structure 24, are actually related to each other by inter-layer prediction. That is, the second inter-dependency syntax structure 26 clarifies the fine-granular inter-dependencies. The second inter-dependency syntax structure 26, however, also defines the inter-dependencies among the layers within each cluster 32 individually, that is, the intra-cluster dependencies between layers. In FIG. 4, for example, six clusters 32 are shown, thereby resulting in 15 possible pairs of clusters 32 for which the second inter-dependency syntax structure 26 regulates the fine-granular inter-dependencies between layers of distinct clusters 32, plus six clusters for which the second inter-dependency syntax structure 26 may regulate the inter-dependencies internally. As was outlined above and as will be further outlined below, there may accordingly be 1 to 21 instantiations 34 of the second inter-dependency syntax structure at the maximum, namely one per cluster individually and one per interlinked pair of clusters 32. Obviously, the second inter-dependency syntax structure 26 does not need to be signaled for pairs of clusters 32 signaled to be non-linked by the first inter-dependency syntax structure 24, thereby saving valuable side information bitrate. It should be noted that in case of using the second inter-dependency syntax structure 26 so as to describe the inter-layer dependencies of layers of different pairs of clusters 32, the numbers of layers per cluster 32 should be equal for all clusters 32. If the layer-ID is described using the concatenation of base layer-ID and extension layer-ID, this is the case. However, it should be mentioned that theoretically the number of layers of the clusters 32 could vary among the clusters 32. In that case, individual instantiations 34 of the second inter-dependency syntax structure 26 would, for example, be signaled within the data stream for each interlinked pair of clusters 32 and at least one instantiation 34 would be transmitted for each cluster size.

FIG. 3, for example, illustrated the case where the layer-ID was obtained from base layer-ID and extension layer-ID by using the base layer-ID as the most significant digit and the extension layer-ID as the less significant digit. FIG. 3 also illustrated the exemplary case where one instantiation 34 was used to describe the inter-layer dependencies of layers within one cluster and another instantiation 34 was used to describe the dependencies between layers of different clusters. For the sake of completeness, it is noted that the matrix 14 of FIG. 3 has as many lines and as many columns as layer-IDs. Merely the lower half below the diagonal is filled because any layer may merely be dependent on any previous, i.e. hierarchically lower, layer by way of inter-layer prediction. In the example of FIG. 3, the column number corresponds to the layer-ID of the layer which, by use of inter-layer prediction, depends on further layers, i.e. base layers, with these base layers indicated by, for example, binary ones, while binary zeroes indicate layers not participating in inter-layer predicting the respective layer, the layer-ID of which corresponds to the current column. Insofar, in the embodiment of FIG. 3, the second inter-dependency syntax structure 26 more or less describes sub-matrices of matrix 14.

Figure 5:
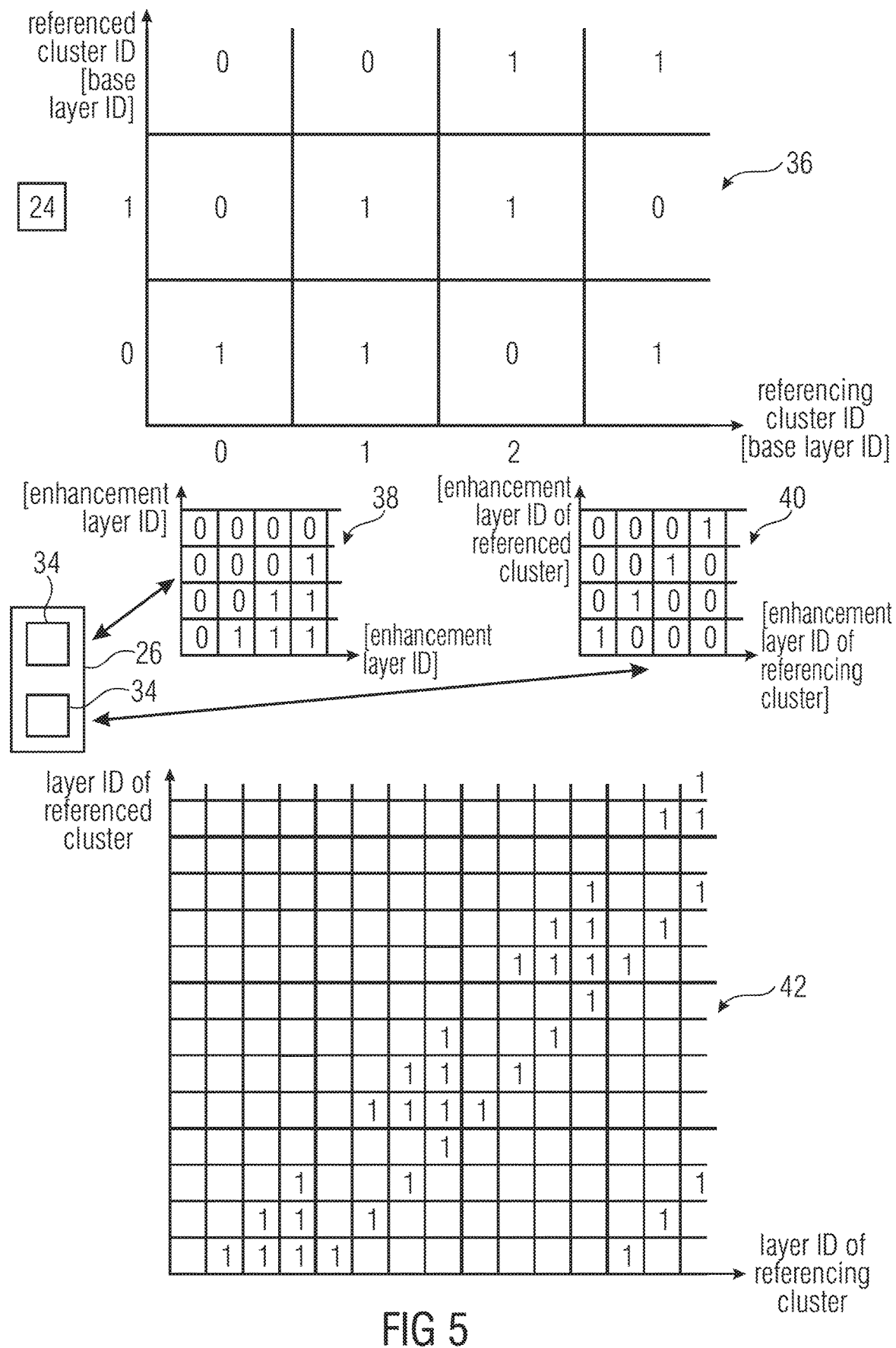
FIG. 5 schematically illustrates a more specific example to derive the inter-layer dependencies in case of using the signaling concept of FIG. 3.

As was already described above, the first and second inter-dependency syntax structures 24 and 26 may be comprised by information 214 within high-level packets 216 (compare FIG. 2). FIG. 5 illustrates an example, where the first inter-dependency syntax structure 24 reveals inter-dependencies among the layer clusters as depicted at 36. For example, a cluster with base layer-ID 2 is dependent on clusters with base layer-ID 2 and 1.

A first instantiation 34 of the second inter-dependency syntax structure is also present in the data stream and regulates the intra cluster dependencies among the layers depicted in FIG. 5 in form of a sub-matrix 38. Further, in accordance with the example of FIG. 5, the data stream also comprises an instantiation 34 of the second inter-dependency syntax structure 26 which regulates the layer-wise inter-dependencies of layers of different clusters. In particular, the second instantiation may describe the dependencies between layers of different clusters via a sub-matrix 40 having one row per enhancement layer-ID of the referenced cluster and one column per enhancement layer-ID of the referencing cluster.

In the example of FIG. 5, sub-matrix 38 is placed at each position where matrix 36 indicates an inter-dependency between clusters, i.e. where a 1 is positioned, and which clusters are of the same base layer-ID, i.e. cluster lying on the diagonal of matrix 36, and the sub-matrix 40 is placed where matrix 36 indicates by a "1" an inter-dependency between clusters of different base layer-ID. The result is shown at 42.

It should be noted that the description of the inter-layer dependencies via a matrix such as matrix 42 is merely one example for describing the inter-layer dependencies. Other descriptions may be used as well. The way matrices 36 to 40 are coded by the first and second inter-dependency syntax structures may by as follows: the first inter-dependency syntax structure 24 may signal a binary value for each coefficient of matrix 36 beneath and including the diagonal. The Instantiation 34 of the second inter-dependency syntax structure 26 indicating matrix 38, may signal a binary value for each coefficient of matrix 38 beneath and excluding the diagonal. The Instantiation 34 of the second inter-dependency syntax structure 26 indicating matrix 40 may signal a binary value for all coefficients of matrix 40.

After having described possibilities as to how to signal the inter-layer dependencies, more detailed implementations are presented hereinafter exemplarily as an extension of the HEVC standard.

In particular, the layer identifier clustering and cluster dependency signaling may be bild into an existing codec as follows.

Two syntax elements nuh_layer_id and layer_id_ext may be used to group the coded layers within the video bitstream into so called clusters based on properties such as spatial relation to each other, coding dependencies or others. The structuring of layer identifiers into cluster may allow for clusters with equally structured coding dependencies within the individual clusters, i.e. the coding dependencies within all or a subset of the defined cluster are the same. Signaling the dependencies within a cluster as an additional set of dependency flags and combining them with existing dependency signaling (cp. direct_dependency_flag in the VPS extension of HEVC extensions) to determine the reference layers of a particular layer may be done as depicted in FIG. 6.

direct_ext_dependency_flag[i][j] equal to 0 specifies that the layer with extension index j is not a direct reference layer for the layer with extension index i within the same layer cluster. direct_dependency_flag[i][j] equal to 1 specifies that the layer with extension index j may be a direct reference layer for the layer with extension index i within the same cluster. When direct_ext_dependency_flag[i][j] is not present for i and j in the range of 0 to (1<<layer_id_ext_len)−1, it is inferred to be equal to 0.

An alternative syntax may limit the loop over the direct_ext_depencency_flag syntax element with max layer_id_ext to avoid signaling coding dependencies to unused layer identifiers.

A more flexible signaling of the coding dependencies within and between clusters may be allowed as follows:
 a) By signaling coding dependencies within clusters on a per cluster basis.
 b) By definition of a number of cluster dependency sets and identification of the clusters (e.g. either by nuh_layer_id) to which a defined cluster dependency set applies.
 c) By hierarchical signaling of dependencies in a way that first dependencies between clusters are signaled and second dependencies of layers within two dependent clusters are signaled.
 d) By combination of b) and c). Therefore following data is signaled:
  1. Dependencies between clusters (e.g. pairs of reference and dependent clusters).
  2. A number of cluster dependency sets defining dependencies between layers within a reference (referenced) cluster and a dependent (referencing) cluster.
  3. For each cluster dependency set an indication to which cluster dependencies it applies (as signaled in 1).

Note that for c) and d) a cluster can depend on itself, when there are dependencies between layers within the cluster.

a) to d) allow to structure the space of layer identifiers when the property space used for structuring, e.g. spatial position of the camera, is not uniformly used. One example is a two-dimensional camera array, which spatial density is not constant or which is not rectangular. The following gives syntax examples for signaling the definition of cluster dependency sets in multiple ways according to the above.

a) FIG. 7 gives an exemplary embodiment in terms of video parameter set extension syntax that defines the coding dependencies within clusters on a per cluster basis.

direct_dependency_flag[i][j] equal to 0 specifies that the layer or cluster with index j is not a direct reference layer or reference cluster for the layer or cluster with index i.

direct_dependency_flag[i][j] equal to 1 specifies that the layer or cluster with index j may be a direct reference layer or reference cluster for the layer or reference cluster with index i. When direct_dependency_flag[i][j] is not present for i and j in the range of 0 to vps_max_layers_minus1, it is inferred to be equal to 0.

general_direct_ext_dependency_flag[i][j] equal to 0 specifies that the layer with extension index j is not a direct reference layer for the layer with extension index i within the same layer cluster. general_direct_dependency_flag[i][j] equal to 1 specifies that the layer with extension index j may be a direct reference layer for the layer with extension index i within the same cluster. When general_direct_ext_dependency_flag[i][j] is not present for i and j in the range of 0 to max_layer_id_ext, it is inferred to be equal to 0.

direct_ext_dependency_flag[i][j][k] equal to 0 specifies that the layer with extension index k is not a direct reference layer for the layer with extension index j within the i-th layer cluster. direct_ext_dependency_flag[i][j][k] equal to 1 specifies that the layer with extension index k may be a direct reference layer for the layer with extension index i within the i-th layer cluster. When direct_ext_dependency_flag[i][j][k] is not present for i, j and k in the range of 0 to max_layer_id_ext, it is inferred to be equal to 0.

b) FIG. 8 gives an exemplary embodiment in terms of syntax in the video parameter set extension that defines the coding dependencies within clusters through signaling of a number of cluster dependency sets (number_of_cluster_dependency_sets), coding dependencies (direct_ext_dependency_flag) within each cluster dependency set and the applying clusters (exemplary identified through a positive flag for their respective nuh_layer_id by the given syntax element included_nuh_layer_id).

c) FIG. 9 gives an exemplary embodiment for hierarchical signaling of dependencies in a way that first dependencies between clusters are signaled and second only dependencies of layers within two dependent clusters are signaled.

direct_dependency_flag[i][j] equal to 0 specifies that the layer or cluster with index j is not a direct reference layer or reference cluster for the layer or cluster with index i. direct_dependency_flag[i][j] equal to 1 specifies that the layer or cluster with index j may be a direct reference layer or reference cluster for the layer or reference cluster with index i. When direct_dependency_flag[i][j] is not present for i and j in the range of 0 to vps_max_layers_minus1, it is inferred to be equal to 0.

NOTE—If layer_id_ext_len is greater than 0, direct_dependency_flag[i][j] signals dependencies between clusters, otherwise (layer_id_ext_len is equal to 0), direct_dependency_flag[i][j] signals dependencies for layers.

direct_ext_dependency_flag[i][j][k][1] equal to 0 specifies that the l-th layer in the j-th cluster is not a direct reference layer for the k-th layer in the i-th cluster. direct_ext_dependency_flag[i][j][k][1] equal to 1 specifies that the l-th layer in the j-th cluster may be direct reference layer for the k-th layer in the i-th cluster. When not present direct_ext_dependency_flag[i][j][k][1] is inferred to be equal to 0.

d) FIG. 10 gives an exemplary embodiment for combination of b) and c).

direct_dependency_flag[i][j] equal to 0 specifies that the layer or cluster with index j is not a direct reference layer or reference cluster for the layer or cluster with index i. direct_dependency_flag[i][j] equal to 1 specifies that the layer or cluster with index j may be a direct reference layer or reference cluster for the layer or reference cluster with index i. When direct_dependency_flag[i][j] is not present for i and j in the range of 0 to vps_max_layers_minus1, it is inferred to be equal to 0.

NOTE—If layer_id_ext_len is greater than 0, direct_dependency_flag[i][j] signals dependencies between clusters, otherwise (layer_id_ext_len is equal to 0), direct_dependency_flag[i][j] signals dependencies for layers.

direct_ext_dependency_flag[n][k][1] equal to 0 specifies that the l-th layer in the j-th cluster is not a direct reference layer for the k-th layer in the i-th cluster when dependency_set_applies_flag[n][i][j] is equal to 1. direct_ext_dependency_flag[n][k][1] equal to 1 specifies that the l-th layer in the i-th cluster may be a direct reference layer for the k-th layer in the i-th cluster when dependency_set_applies_flag[n][i][j] is equal to 1.

dependency_set_applies_flag[n][i][j] equal to 0 specifies that dependencies between layers in the i-th cluster and layers in the i-th cluster are not specified by direct_ext_dependency_flag[n][k][1]. dependency_set_applies_flag[n][i][j] equal to 1 specifies that dependencies between layers in the i-th cluster and layers in the j-th cluster are specified by direct_ext_dependency_flag[n][k][1]. When not present dependency_set_applies_flag[n][i][j] is inferred to be equal to 0. When dependency_set_applies_flag[n][i][j] is equal to 0 for a particular combination of i and j and all n in the range of 0 to (number_of_cluster_dependency_sets−1), inclusive, no layer in the j-th cluster is a direct reference layer of any layer in the i-th cluster.

Thus, in the above examples of implementing the cluster-based inter-dependency signaling of FIGS. 2 to 5 into an HEVC extension, the packets 206 of FIG. 2 were slices or slice segments and packets 216 were, for example parameter sets such as video, picture or sequence parameter sets. In accordance with the syntax example of FIG. 7, the first inter-dependency syntax structure 24 is signaled using the syntax element direct dependency flag for each pair of clusters i, j, with i≤j, wherein vps_max_layers_minus1 is the maximum number of base layer-IDs minus 1. The syntax elements thus reveal the coarse matrix 36 of FIG. 5, for example. A syntax element, called unique_cluster_dependencies_flag, 44 distinguishes between two options: either one instantiation of the second inter-dependency syntax structure 26 is submitted and applied to all base layer-IDs, or one instantiation is transmitted for each base layer-ID i. In the first case, flags general_direct_ext_dependency_flag build up a sub-matrix according to 38 for each base layer-ID commonly, and in the second case, flags direct_ext_dependency_flag build up a sub-matrix according to 38 for each base layer-ID separately. unique_cluster_dependencies_flag switches between both options. Accordingly, in the case of FIG. 7, if unique_cluster_dependencies_flag equals 0, the resulting sub-matrix 38 is placed within matrix 36 at each position corresponding to equal referencing and referenced cluster ID, where a 1 is indicated by direct_dependency_flag. The remaining positions, where the first inter-dependency syntax structure 24 indicate an interdependency between clusters of different cluster-IDs, may be filled using predetermined sub-matrices, i.e. ones known by all participating devices such as encoder, network element and multi-layer video decoder, by default. In the case of unique_cluster_dependencies_flag being equal to 1, for each position where the first inter-dependency syntax structure 24 indicates a 1 at positions of equal referenced and referencing cluster-ID, separate sub-matrix for this very cluster-ID is signaled and positioned at the respective position in matrix 42. Accordingly, max layer_id_ext corresponds to the number of layers within each of the vps_max_layers_minus1 clusters.

In the case of FIG. 8, the first inter-dependency syntax structure 24 is transmitted in the same manner as in the example of FIG. 7: for each cluster-ID one flag per cluster ID being equal to or smaller than the respective cluster-ID. A flag cluster_dependency_sets_present_flag 46 switches between the first option of FIG. 7 using syntax elements general_direct_ext_dependency_flag as already outlined above, and a different mode according to which the number of instantiations of the second inter-dependency syntax structure 26 submitted in the data stream using syntax elements direct_ext_dependency_flag is explicitly signaled using a syntax element called number-of-cluster-dependency-sets. These instantiations are then associated with the cluster-IDs for which these instantiations shall apply, by explicitly listing the cluster-IDs for which each instantiation shall apply by using of syntax elements included_nuh_layer_id 50. By this measure, the instantiations 34 of the second inter-dependency syntax structure 26 are not submitted for each cluster-ID. Rather, merely a smaller number of instantiations of the second inter-dependency syntax structure 26 are submitted in case of cluster_dependency_sets_present_flag being equal to 1, associating each instantiation to the cluster-ID which same is associated with. Again, as far as inter-dependent pairs of different clusters are concerned, default rules may be applied for filling matrix 42 at such positions (below the cluster diagonal).

In accordance with the example of FIG. 9, the signaling of the second inter-dependency syntax structure is exemplarily signaled in an interleaved manner with respect to the first inter-dependency syntax structure, but this interleaving may be left out in accordance with an alternative embodiment. In any case, in the embodiment of FIG. 9, a sub-matrix 38 or 40, i.e. an instantiation 34 of the second inter-dependency syntax structure 26, is submitted for each pair of (equal or unequal) cluster-IDs for which the first inter-dependency syntax structure 24 indicates inter-cluster dependency. As is derivable from the syntax example, the transmission of sub-matrices 40 consumes more bits direct_ext_dependency_flag than sub-matrices 38. This is derivable from the conditional clause 52 and conditional clause 54, respectively. In other words, in transmitting instantiations of the second inter-dependency syntax structure 26 for cluster-internal inter-dependency regulations, where the referencing cluster-ID indicated by counter i equals the referenced cluster-ID indicated by j, direct_ext_dependency_flag is merely transmitted for combinations of the enhancement layer-ID for the reference and referencing layer for which the enhancement layer-ID of the referenced layer, here 1, is smaller than the enhancement layer-ID of the enhancement layer-ID of the referenced layer, here k. That is, of sub-matrix 38, direct_ext_dependency_flag is merely transmitted for the positions below the diagonal of the sub-matrix 38. In the other case, i.e. for instantiations of the second inter-dependency syntax structure 26 for inter-dependent cluster pairs i≠j, the complete sub-matrix is transmitted, i.e. a flag direct_ext_dependency_flag for each position of sub-matrix 40.

The embodiment of FIG. 10 combines the special features of the embodiments of FIGS. 8 and 9: complete sub-matrices, i.e. instantiations of the second inter-dependency syntax structure 26 are submitted, namely number_of_cluster_dependency_sets in number, and then each of these instantiations are associated with the grid sites of matrix 36, where the respective instantiation of the second syntax structure 26 shall apply (among those for which the first syntax structure 24 indicates the presence of cluster-independency (compare 56) by a one, for example.

In even other words, as described with respect to FIG. 9, a plurality of instantiations 34 of the second inter-dependency structure 26 may be read from the multi-layer data stream, namley for pairs (j,k) of values 0<k≤j≤n<N, with N being the number of values representable by the base layer-ID. n may set to be equal to N, but as also described herein, an explicit signaling of the actually used cluster cardinality may be used so as to restrict the transmission overhead. The pairs (j,k) are traversed (see for loops over i and j at 24 in FIG. 9) and reading the second inter-dependency structure for is performed or suppresses for pair (j,k) conditionally depending on the first inter-dependency syntax structure indicating a presence or non-presence of interdependency between this pair (see "if direct_dependency_flag[i,j]" in FIG. 9, where i,j correspond to j and k, respectively), wherein the instantiation 34 of the second inter-dependency structure 26 read for pairs (j,k) with j=k, indicates which layers among those having base layer-ID j are inter-layer prediction dependent on other layers among those having base layer-ID j, and the instantiation 34 of the second inter-dependency structure 26 read for a pair of different values (j,k) with j>k, indicates which layers among those having base layer-ID j are inter-layer prediction dependent on layers among those having base layer-ID k. Similar to FIG. 7, however, at may also be that one instantiation of the second inter-dependency structure 26 is read from the multi-layer data stream, the one instantiation of the second inter-dependency structure 26 indicating commonly for each cluster value pair (j,j), which layers among those having base layer-ID j are inter-layer prediction dependent on other layers among those having base layer-ID j, as it is the case in FIG. 7 if unique_cluster_dependencies_flag equals 0, or commonly for pairs (j,k) with j unequal k, for which the first inter-dependency syntax structure (24) indicates a presence of interdependency between the respective pair, which layers among those having base layer-ID j are inter-layer prediction dependent on layers among those having base layer-ID k, respectively. Denoting the number of values representable by the extension layer-ID 22 as M, the second inter-dependency syntax structure may comprises one binary value for each pair (p,q) of extension values 0<q<p≤m<M, in order to indicate which layers among those having base layer-ID i are inter-layer prediction dependent on other layers among those having base layer-ID i, and one binary value for each pair of extension values 0<p,q≤m<M, in order to indicate which layer with extension value p and having base layer-ID j is inter-layer prediction dependent on layer with extension value q and having base layer-ID k. Again, as described elsewhere in the specification, m may set to be equal to M, but as also described herein, an explicit signaling of the actually used extension cardinality may be used so as to restrict the transmission overhead. Further, as shown in FIGS. 8 and 10, an index syntax structure 50 may be used so as to associate instantiations of the second inter-dependency structure to the individual pairs (j,k) of base layer-ID values. Here, FIG. 10 reveals that the association syntax structure may comprise a flag for each pair (j,k) and the parsing of the association syntax structure may involve skipping pairs (j,k) of values 0<k≤j≤n<N for which the first inter-dependency syntax structure indicates the non-presence of interdependency (independency) between pair (j,k).

That is, what has been described in the above section could be denoted as a "layer identifier clustering and cluster dependency signaling". In this regard, the device may be a video decoder. The video decoder, thus operating, would be able to select packets of the bitstream identified by (the extended) layerID for decoding. The device could, however, alternatively be a network element which would be able to discard packets of a bitstream that are identified by (the extended) layerID based on external factors such as network utilization, knowledge about decoders, etc.

Naturally, above outlined concept would also impact an existing encoder of a codec to be improved by the concept: The encoder such as the one of FIG. 2, would be configured to encode into a multi-layered data stream 10 a video material at different layers, corresponding to different levels of information amount, using inter-layer prediction, the multi-layer data stream comprising a plurality of packets 12, each of which is associated with one of the different layers, each layer being indexed by a base layer ID 20 or a base layer ID 20 and an extension layer ID 22, and to insert, into the multi-layered data stream, the first inter-dependency syntax structure 24 indicating interdependencies between pairs of different values representable by the base layer-ID 20, and a second inter-dependency syntax structure 26 indicating inter-dependencies between pairs of different values representable by the extension layer-ID 22, with setting the first and second inter-dependency syntax structures such that, based on the first and second inter-dependency syntax structures, an inter-layer dependency description 14 revealing possible inter-layer prediction dependencies between the different layers is constructible.

Figure 11:
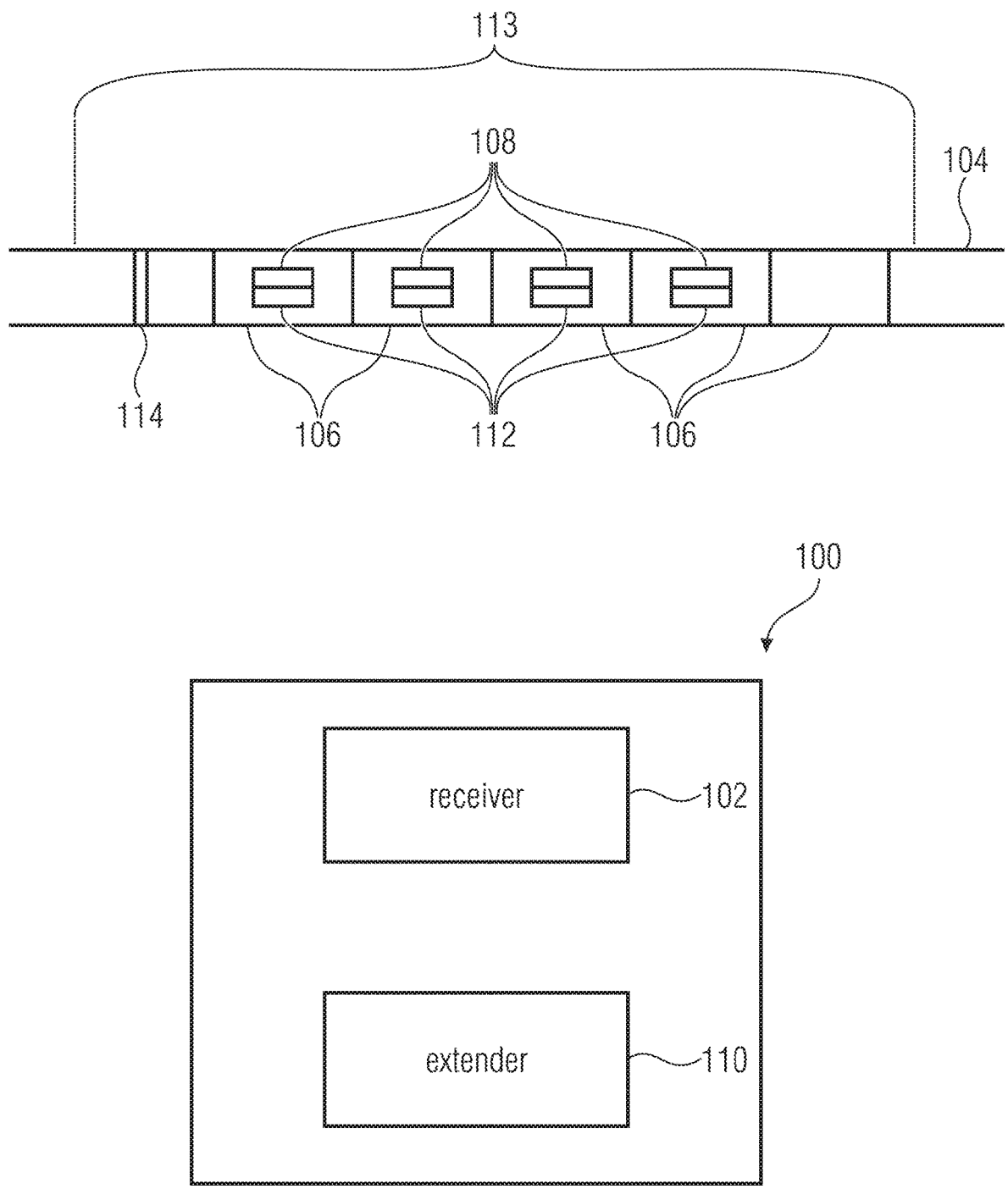
FIG. 11 schematically shows a device for setting up a further concept of the present application according to which a maximally assumed value of an extension layer-ID field is signaled in the data stream.

The details described next concern a possibility to signal layer-related information in an efficient manner, wherein such layer-related information may, for example, include information concerning inter-layer dependencies as outlined with respect to FIGS. 2 to 10. As a starting point, the situation often presented above is used, according to which the layer identification syntax element structure 208 comprised by each packet 206 (compare FIG. 2) is composed of a base layer-ID field 108 and an extension layer-ID field 112 as depicted in FIG. 11. FIG. 11 shows a device 100 for processing a multi-layered data stream such as a network element 218 or a multi-layered video decoder 220 as shown in FIG. 2. The device 100 is shown as comprising a receiver 102 configured to receive a multi-layered video signal composed of a sequence of packets, each of which comprises a layer identification syntax element.

The multi-layered video signal 104 (corresponding to 204 in FIG. 2) received by receiver 102 is composed of a sequence of packets 106 (corresponding to 206 in FIG. 2), each of which comprises a layer identification syntax element structure (corresponding to 208 in FIG. 2) comprising at least a base layer-ID field 108 and, unconditionally or conditionally depending on the value of a high-level syntax element or the base layer-ID field 108, an extension layer-ID field 112.

The packets 106 may, for example, be NAL units, slices, tiles, pictures or other packets into which the multi-layered video signal 104 is subdivided. A layer identification extender 110 also comprised by device 100 reads, for a predetermined portion of the multi-layered video signal comprising a plurality of packets 106, such as portion 113, a maximum syntax element from the multi-layered video signal, indicating a maximally assumed value of the extension layer-ID field 112 of the packets 108 comprised by the predetermined portion 113 of the multi-layered video signal. The predetermined portion 113 may, for example, be a coded video sequence, a chunk, a group of pictures or the like. The maximum syntax element 114 may be contained within a special packet of portion 113 such as, for example, a VPS NAL unit. For each of the packets within the predetermined portion 113, the extender 110 determines a layer ID for the respective packet based on the layer-ID syntax structure composed of 108 and, conditionally, 112. For example, a concatenation of both values of both syntax elements 108 and 112 may result in the layer ID.

The extender 110 may derive a bit length of the extension layer-ID field using the maximum syntax element as is illustrated above. Alternatively, an extra syntax element may be used to this end. Even alternatively, the number of bits for representing the extension layer-ID field 112 may be fixed by default.

Extender 110 then determines the maximum number of layers within the portion 112 based on the maximum assumed value. For example, extender 110 also reads a syntax element from the data stream 104 indicating for portion 113 the maximum assumed value for the base layer-ID field 108 of the packets 106 within portion 113 and combines both maximum assumed values for determining the maximum number of layers.

The extender 110 determines at least one characteristic for each of the maximum number of layers by iteratively parsing a layer characterizing syntax portion of the multi-layered video signal a number of times equal to the maximum number of layers. Advantageously, the data stream 104 does not need to signal the at least one characteristic for each possible value, i.e. not for the whole cardinality of the extension layer-ID field 112, but merely for the actually used sub-portion out of this cardinality. Additionally, a maximum syntax element 114 may even be used so as to derive of the number of representation bits of the extension layer-ID field 112 within the data stream 104 as just-described. The "characteristic" may, for example, be the inter-layer prediction to other layers or the like.

Figure 12:
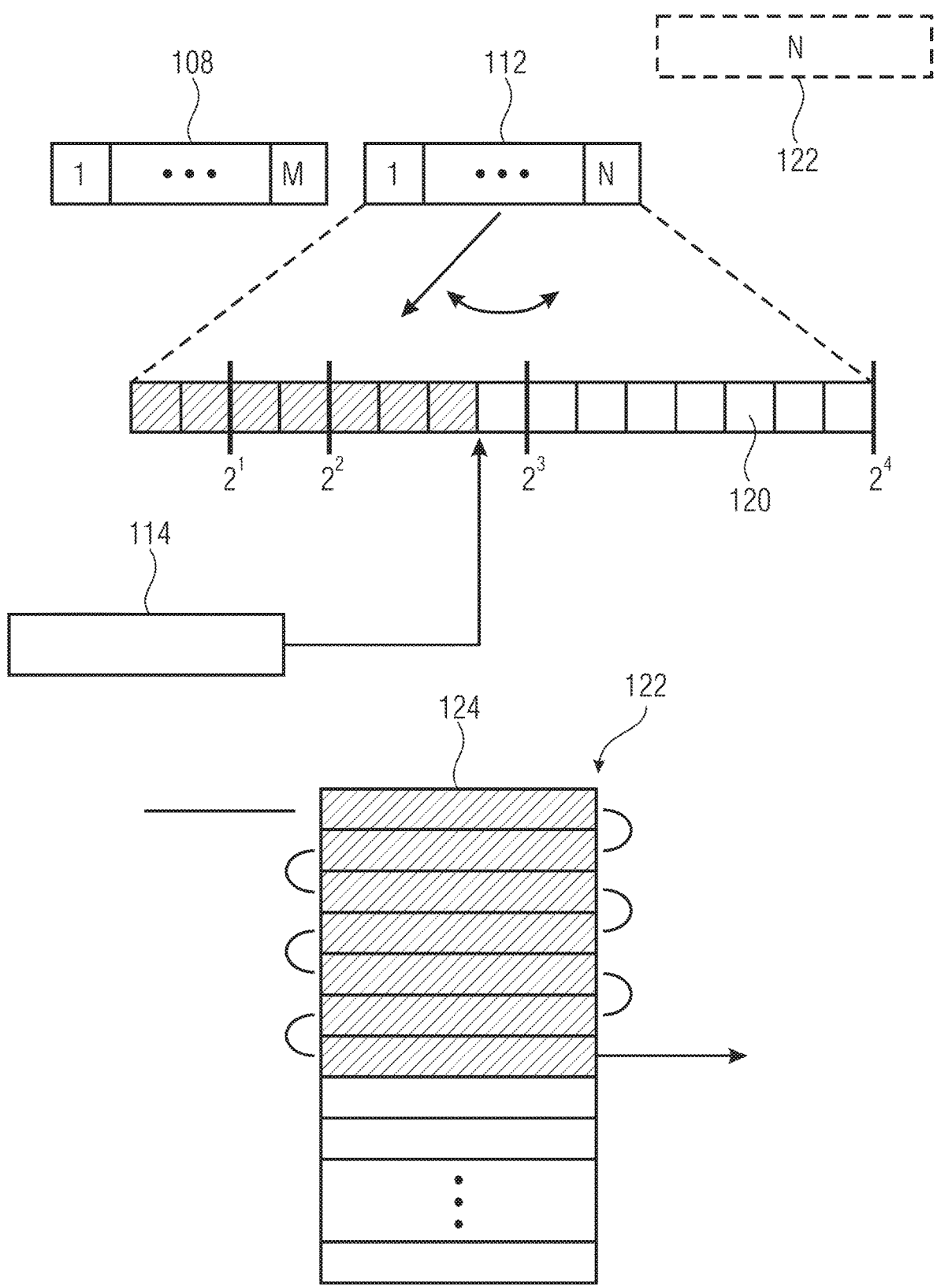
FIG. 12 schematically illustrates a concept of FIG. 11.

In other words, with respect to FIG. 11 it has been described that it is possible to transmit within the data stream 204/104 an explicit signalization as to how many out of the representable states of the extension layer-ID field are actually assumed when considering all packets 106/206 within the predetermined portion 113 of interest. For example, let the extension layer-ID field 112 be a field of N bits, then $2^N$ extension layer-IDs 120 would be representable by the extension layer-ID field 112. The length of field 112 may be fixed or may be signaled and set within the data stream by way of a certain high-level syntax element indicated using dashed lines 122 in FIG. 12. For some reason, however, not all of the available extension layer-IDs may have been used within the predetermined portion 113 of interest. In FIG. 12, for example, it is illustrated that merely 7 representable extension layer-IDs are used, namely by way of hatching.

In accordance with FIG. 11, a maximum syntax element 114 indicates this number of actually used/assumed values of the extension layer-ID field 112. Owing to this syntax element 114, it is feasible to insert layer-specific information merely with respect to the actually assumed number of extension layer-IDs into the data stream rather than for the complete number of representable values of extension layer-ID field 112. Thus, as illustrated at 122 in FIG. 12, a device parsing the multi-layered video signal may, for example, parse a certain layer characterizing syntax portion 124 of the multi-layered video signal, merely a number of times equal to the maximum number of layers as indicated by syntax element 114 rather than the complete numbers of actually available/representable values of the extension layer-ID field. The side information amount consumed with the data stream may, accordingly, kept lower. For example, in the examples of FIGS. 6 to 10, it would be feasible to set max_layer_id_ext to be equal to the maximally assumed number of extension states as indicated by syntax element 114 rather than setting this value to be equal to the maximum number of representable values of the extension layer-ID field 112. Thus, the "characterizing syntax portion" 124 may be embodied by the previously presented flag direct_ext_dependency_flag.

As already outlined above, the existence/signaling of the bit length of field 112 is optional. In any case, the granularity/fidelity at which syntax element 114 indicates the number of actually used/active extension layer-IDs is increased compared to the more coarse setting of the number of available/representable values of the extension layer-ID field 112 as set by syntax element 122. Advantageously the fidelity or granularity at which syntax element 114 indicates the number of actually assumed values of the extension layer-ID field 112 is fine enough in order to indicate the exact number of actually assumed values. Alternatively, a fidelity/granularity somewhere between one and the fidelity/granularity of the signalization of the maximum number of available/representable values of field 112 as provided by syntax element 122 would be feasible as well. In other words, the maximum syntax element 114 may indicates the maximally assumed value of the extension layer-ID field 108 in units smaller than $(n-1)^2$ with n being the bit length of the extension layer-ID field, or may even be one.

Thus, in accordance with FIGS. 11 and 12 it has been described that a device, such as a network element or a multi-layered video decoder, may comprise a receiver 102 and an extender 110 wherein the receiver 102 is configured to receive a multi-layered video signal 104 composed of a sequence of packets 106 each of which comprises a layer identification syntax element structure composed of a base layer-ID field and, possibly merely on a conditional basis, an extension layer-ID field 112, wherein the layer identification extender 110 is configured to read, for a predetermined portion 113 of the multi-layered video signal comprising a plurality of packets 106 out of the sequence of packets 106, a maximum syntax element 114 from the multi-layered video signal 104, the maximum syntax element 114 indicating a maximally assumed value of the extension layer-ID field 112 among the packets 106 comprised by the predetermined portion 113. The extender 110 determines, for each of the packets 106 within the predetermined portion 113, the layer-ID for the respective packet 106 based on the layer identification syntax element structure such as by concatenating base layer-ID and extension layer-ID of field 108 and 112 as outlined above. The extender 110 also determines a maximum number of layers within the predetermined portion 113 based on the maximally assumed value and determines at least one characteristic for each of the maximum number of layers by iteratively parsing a layer characterizing syntax portion 104 a number of times equal to the maximum number of layers. The "maximum number of layers" may denote the maximum number of layers per cluster when combining the embodiment of FIGS. 11 and 12 with the embodiment outlined above with respect to FIGS. 2 to 10, in which case the determination of the "maximum number of layers" is for example directly adopting the maximally assumed value as the "maximum number of layers", and the "at least one characteristic" may be the number of flags indicating the inter-layer dependencies within the second inter-dependency syntax structure. Another example of a characteristic, however, may also be a signalization within the data stream of corresponding coding parameters set for the individual layer-IDs. In that case, the "maximum number of layers" may be determined to be equal to the number of used or representable base layer-IDs times the maximally assumed value, i.e. the number of actually used/assumed extension layer-IDs. Other examples are feasible as well. In any case, the transmission of the actually assumed value by way of syntax element 114 enables to save valuable side information bit rate.

The concept of FIGS. 11 and 12 may, as already outlined above, be combined with the concept outlined above with respect to FIG. 2 to 10 or may be used isolatedly without using the concept previously described.

Similarly to the above description brought forward with respect to FIGS. 2 to 10, however, the following description reveals a possibility how to build the concept of FIGS. 11 and 12 into an existing video codec such as an extension of HEVC.

In HEVC, a layer identifier variable, referred to as LayerID, may be derived from the explicitly signaled layer identifier in the header of video and meta data packets, e.g. nuh_layer_id and additional information signaled in the each chunk of video or meta data packets, forming a new variable LayerId of the specific data packet to be used for its identification.

The additional information signaled according to FIGS. 11 and 12 may involve an additional syntax element, cp. layer_id_ext, e.g. within some part of the header or payload of the video or meta data packet, given that the specific video or meta data packet belongs to an enhancement layer, thereby keeping compatibility with base layer only legacy devices. A default value can be assumed for layer_id_ext when the video or meta data packet belongs to the base layer but is processed by an enhancement layer processing capable device.

FIG. 13 gives an example for a slice-segment header that signals the additional information as the syntax element layer_id_ext in the slice header that is contained in a video data packet of enhancement layer (c.p. nuh_layer_id>0) of a HEVC coded video.

A mathematical operation is used in order to combine nuh_layer_id and layer_id_ext into LayerId that allows a larger identifier space and is unique for a unique combination of two values of the nuh_layer_id and layer_id_ext. The mathematical operation can for example be using the bits of nuh_layer_id as MSB and the layer_id_ext as LSB of the LayerId variable or vice versa, e.g. as following.

The variable LayerId is determined as follows, where LengthOfExtension is the length of the layer_id_ext syntax elements in terms of bits.

LayerId=(nuh_layer_id<<LengthOfExtension)+layer_id_ext

The concept of FIGS. 11 and 12 may include explicit signaling of the amount of bits that is used to transmit the additional information (cp LengthOfExtension above) in some part of the header or payload of the video or meta data packet in order to make efficient use of the transmitted amount of data. FIG. 14 gives exemplary syntax and semantics of the LengthOfExtension value signaling in meta data packets such as the HEVC Video Parameter Set extension syntax.

layer_id_ext_len indicates the number of bits used for extending the LayerId range.

The concept of FIGS. 11 and 12 includes explicit signaling of the maximum value of the layer_id_ext syntax element used in the coded video bitstream, e.g. max_layer_id_ext. Based thereon, the lowest possible amount of bits that may be used for transmitting the additional information (cp LengthOfExtension above) in some part of the header or payload of the video or meta data packet may be derived in order to make efficient use of the transmitted amount of data. FIG. 15 gives exemplary syntax and semantics of the maximum value of the layer_id_ext syntax element value signaling in meta data packets such as the HEVC Video Parameter Set extension syntax.

max_layer_id_ext indicates the maximum value of layer_id_ext syntax element in any slice header within the coded video sequence.

Two exemplary variants of the semantics of the layer_id_ext syntax element depending on the above extensions of the invention are given in the following.

layer_id_ext is used in combination with nuh_layer_id to identify the layer. The syntax element layer_id_ext is coded using layer_id_ext_len bits. When not present, its value is inferred to 0.

layer_id_ext is used in combination with nuh_layer_id to identify the layer. The syntax element layer_id_ext is coded Ceil(Log2(max_layer_id_ext)) bits. When not present, its value is inferred to 0

Layer identifier of parameter set or SEI messages of the HEVC video codec standard can be extended given in FIG. 16a-16c without parsing dependencies.

In a layered coding scenario, signaling that is related to the layer identifier or the maximum number thereof, is adjusted to cover the extended layer identifier space (cp. value range of LayerId) instead of the regular explicit layer identifier space (cp. value range of nuh_layer_id), as exemplarily given with the syntax table for the video parameter set extension in FIG. 17, where the variable VpsMaxNumLayers is exemplarily given as follows. The variable VpsMaxNumLayers specifying the maximum number of layer in the extended layer range is set equal to (vps_max_layers_minus1)*$2^{layer\_id\_ext\_len}$.+1 or

The variable VpsMaxNumLayers specifying the maximum number of layer in the extended layer range is set equal to (vps_max_layers_minus1)*max layer_id_ext.+1 layer_id_in_nalu[i] specifies the value of the LayerId value associated with VCL NAL units of the i-th layer. For i in a range from 0 to VpsMaxNumLayers−1, inclusive, when not present, the value of layer_id_in_nalu[i] is inferred to be equal to i.

When i is greater than 0, layer_id_in_nalu[i] shall be greater than layer_id_in_nalu[i−1].

For i in a range from 0 to vps_max_layers_minus1, inclusive, the variable LayerIdInVps[layer_id_in_nalu[i]] is set equal to i.

dimension_id[i][j] specifies the identifier of the j-th present scalability dimension type of the i-th layer. The number of bits used for the representation of dimension id[i][j] is dimension_id_len_minus1[j]+1 bits. When dimension_id[i][j] is not present for j in the range of 0 to NumScalabilityTypes−1, inclusive, dimension_id[i][j] is inferred to be equal to ((layer_id_in_nalu[i] & ((1<<dimBitOffset[j+1])−1)) >>dimBitOffset[j]).

The variable ScalabilityId[i][smIdx] specifying the identifier of the smIdx-th scalability dimension type of the i-th layer, the variable ViewId[layer_id_in_nalu[i]] specifying the view identifier of the i-th layer and the variable ViewScalExtLayerFlag specifying whether the i-th layer is a view scalability extension layer are derived as follows:

```
for ( i = 1; i <= VpsMaxNumLayers; i++) {
    lId = layer_id_in_nalu[ i ]
```

```
    for( smIdx= 0, j =0; smIdx < 16; smIdx ++ )
        if( ( i ! = 0 ) && scalability_mask[ smIdx ] )
            ScalabilityId[ i ][ smIdx ] = dimension_id[ i ][ j++ ]
        else
            ScalabilityId[ i ][ smIdx ] = 0
    ViewId[ lId ] = ScalabilityId[ i ][ 0 ]
    ViewScalExtLayerFlag[ lId ] = ( ViewId[ lId ] != ViewId[ 0 ] )
}
```

Naturally, above outlined concept would also impact an existing encoder of a codec to be improved by the concept: The encoder such as the one of FIG. 2, would be configured to encode the video signal into the multi-layered video signal 104 composed of a sequence of packets 106 each of which comprises a layer identification syntax element structure composed of a base layer-ID field 108 and an extension layer-ID field 112, and to insert, for a predetermined portion 113 of the multi-layered video signal comprising a plurality of packets, the maximum syntax element 114 into the multi-layered video signal, indicating the maximally assumed value of the extension layer-ID field 108 of the packets comprised by the predetermined portion 113 of the multi-layered video signal, determine a maximum number of layers within the predetermined portion of the multi-layered video signal based on the maximally assumed value, and signal at least one characteristic for each of the maximum number of layers in the multi-layered video signal 104 by iteratively writing a layer characterizing syntax portion 124 of the multi-layered video signal a number of times equal to the maximum number of layers. The encoder would, for example, delay the output of the stream 104 till having finished the coding of portion 113.

The following figures deal with a concept of signaling the layer ID of the packets contained in the multi-layer data stream and a possibility of achieving an efficient of signaling this layer-ID using the extension mechanism without compromising backward compatibility in the case of a necessity which, due to any reasoning, requests that a certain value of the base layer ID, such as 0, is excluded from the possibility of having appended thereto an extension layer-ID. The latter necessity results in the following asymmetry: for almost all possible values of the base layer-ID, appending an extension layer-ID is feasible. This results in the following asymmetry: for almost all values of the base layer-ID, the appending of an extension layer-ID is feasible, thereby resulting in the number of these almost all values of base layer-ID times the number of representable values of the extension layer-ID representable layer-ID values. The restricted base layer-ID value, however, excludes the possibility of appending any extension layer-ID. Accordingly, either this asymmetry is accepted, or the forbidden value of the base layer-ID is not used in case of using the extension mechanism. The solution set out below overcomes this problem in a more efficient way.

This time, the description of this next concept is immediately outlined with respect to a possible extension of the HEVC standard where the just outlined restriction exactly applies. However, the concept outlined below is also transferrable to other codecs which, for example, impose similar restrictions onto any layer indication extension mechanism.

A restriction of HEVC is, as outlined above, that the base layer cannot be extended. Hence to comply with the HEVC specification the layer id extension value layer_id_ext cannot be signaled for layers with nuh_layer_id equal to 0 and therefore the cluster associated with nuh_layer_id equal to 0 can only include the base layer itself. Such an unequal number of layers in different clusters might be undesirable.

The issue can be resolved by the below outlined concept, which derives clusters and layer id extension values within the clusters in a different way than described above. Since it is not possible to have multiple layers for nuh_layer_id equal to 0, the restriction to not have multiple layers is extended to other nuh_layer_id values not equal to 0. Layers belonging to these restricted nuh_layer_id values are then combined with layers from unrestricted nuh_layer_id values to form clusters with an equal number of layers.

The basic idea is that nuh_layer_id is split into two values by, for example, bit masking. One value is used to determine the cluster. This way different nuh_layer_id values can belong to the same cluster. The other value is utilized to determine the presence of the layer_id_ext value (hence to determine if multiple layers can belong to the nuh_layer_id value) and to determine an additional offset to the layer_id_ext_value in LayerId derivation.

Figure 18:
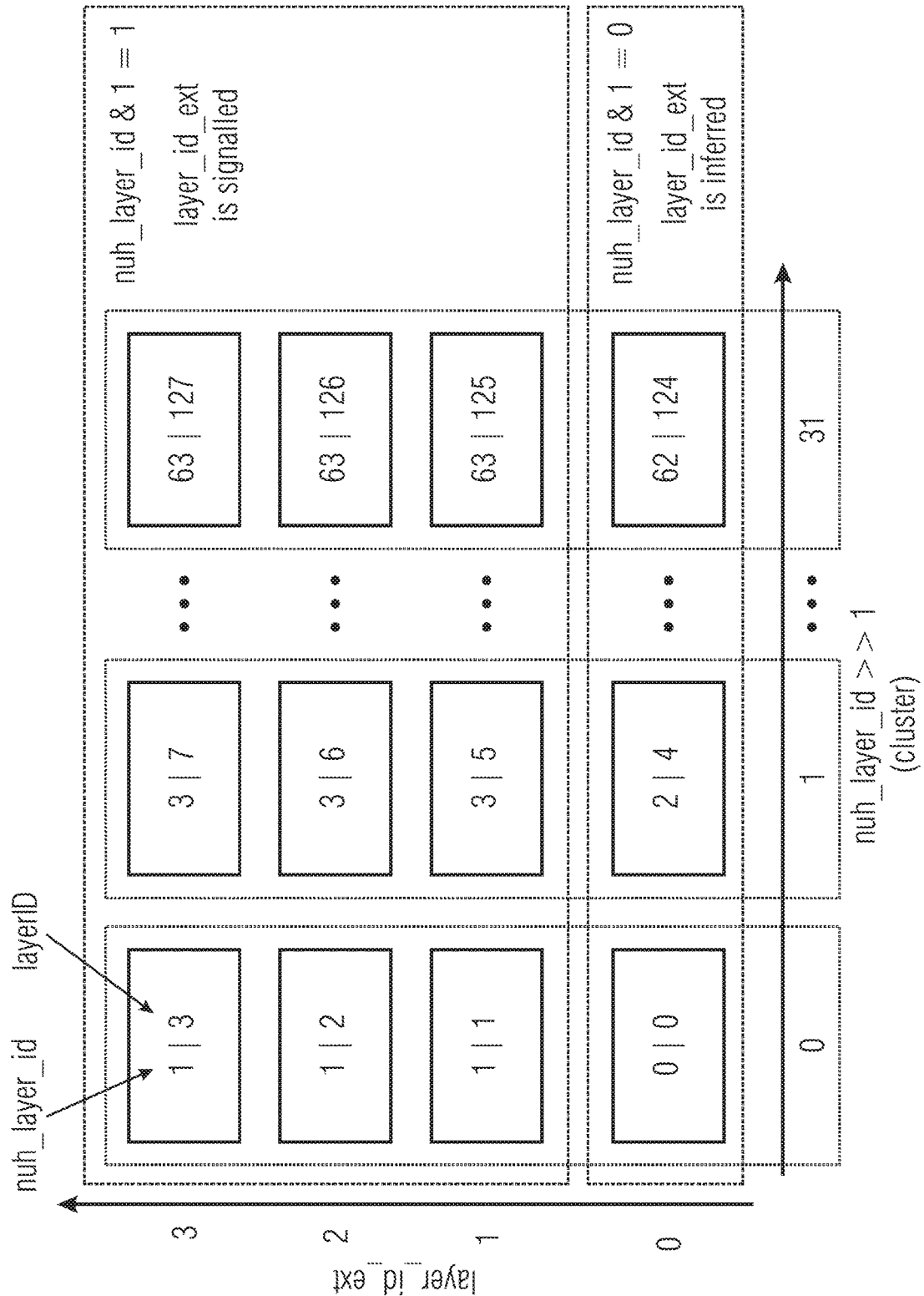
FIG. 18 shows a schematic exemplifying relationships between extension layer-ID field, base layer-ID field and layer-ID in accordance with a specific example, in particular using layer_id_ext to denote the extension layer-ID field, nuh_layer_id so as to denote the base layer-ID field, and layerID so as to denote the layer-ID, and the number of representable values of the extension layer-ID field being indicated by max layer_id_ext(plus1), here being exemplarily set to 3 by choosing the length of the extension layer-ID field to be 2 by setting Length Of Extension equal to 2.

An example for an embodiment of the basic idea is given in the following and illustrated in FIG. 18. FIG. 18, thus, provides an example for the relationships between layer_id_ext, nuh_layer_id and LayerId for the exemplary case of max layer_id_ext equal to 3 (LengthOfExtension equal to 2).

In the example only, the five most significant bits of the six bit nuh_layer_id value are used to determine the cluster, hence two nuh_layer_id values with different least significant bits belong to one cluster.

If the least significant bit is equal to 0, no layer_id_ext values are signaled for the nuh_layer_id and only one layer belongs to the nuh_layer_id. By definition this layer is the layer with layer_id_ext equal to 0 within the cluster specified by the five most significant bits. Otherwise, if the least significant bit is equal to 1, multiple layers belong to the nuh_layer_id value. For each layer a layer_id_ext value is signaled explicitly and each layer belongs to the cluster specified by the five most significant bits.

The syntax table of FIG. 19 might be used for the embodiment. It shows a header of a packet 206, i.e. a slice segment header—or, to be more precise, a fragment thereof.

Layer_id_ext is not present when the least significant bit of nuh_layer_id is equal to 0. When it is not present, it is inferred to be equal to 0. The variable LayerId is determined as follows, where LengthOfExtension is the length of the layer_id_ext syntax elements in terms of bits.

LayerId=((nuh_layer_id>>1)<<LengthOfExtension)+
layer_id_ext

In another embodiment a variable add_layer_id_ext_len is signaled in the bitstream, e.g. in the VPS. (Please note that the previously described embodiment is a special case of this embodiment with add layer_id_ext_len equal to 1). The (6−add layer_id_ext_len) most significant bits of the six bit nuh_layer_id syntax element are used determine the cluster. The least add_layer_id_ext_len significant bits specify whether layer_id_ext is inferred. Furthermore they specify an offset additional to the layer_id_ext value. The syntax tables of FIGS. 20a and 20b are used to demonstrate the embodiment:

In the embodiment layer_id_ext is only present when the add_layer_id_ext_len least significant bits of nuh_layer_id are equal to 1. When layer_id_ext is not present it is inferred to be equal to 0. The variable LayerId is determined as follows, where LengthOfExtension is the length of the layer_id_ext syntax elements in terms of bits.

LayerId=((nuh_layer_id>>add_layer_id_ext_len)
<<LengthOfExtension)+layer_id_ext+layerI-
dExtOffset Thus, in accordance with the concept outlined above with respect to FIGS. 18 to 20b a device, such as a network element of multi-layered video decoder such as those depicted in FIG. 2, configured to process a multi-layer data stream into which a video material is coded at different layers, corresponding to different levels of information amount, using inter-layer prediction, would do the following for each of the packets comprised by the multi-layer data stream, each packet being associated with one of different layers, as already described above.

Figure 21:
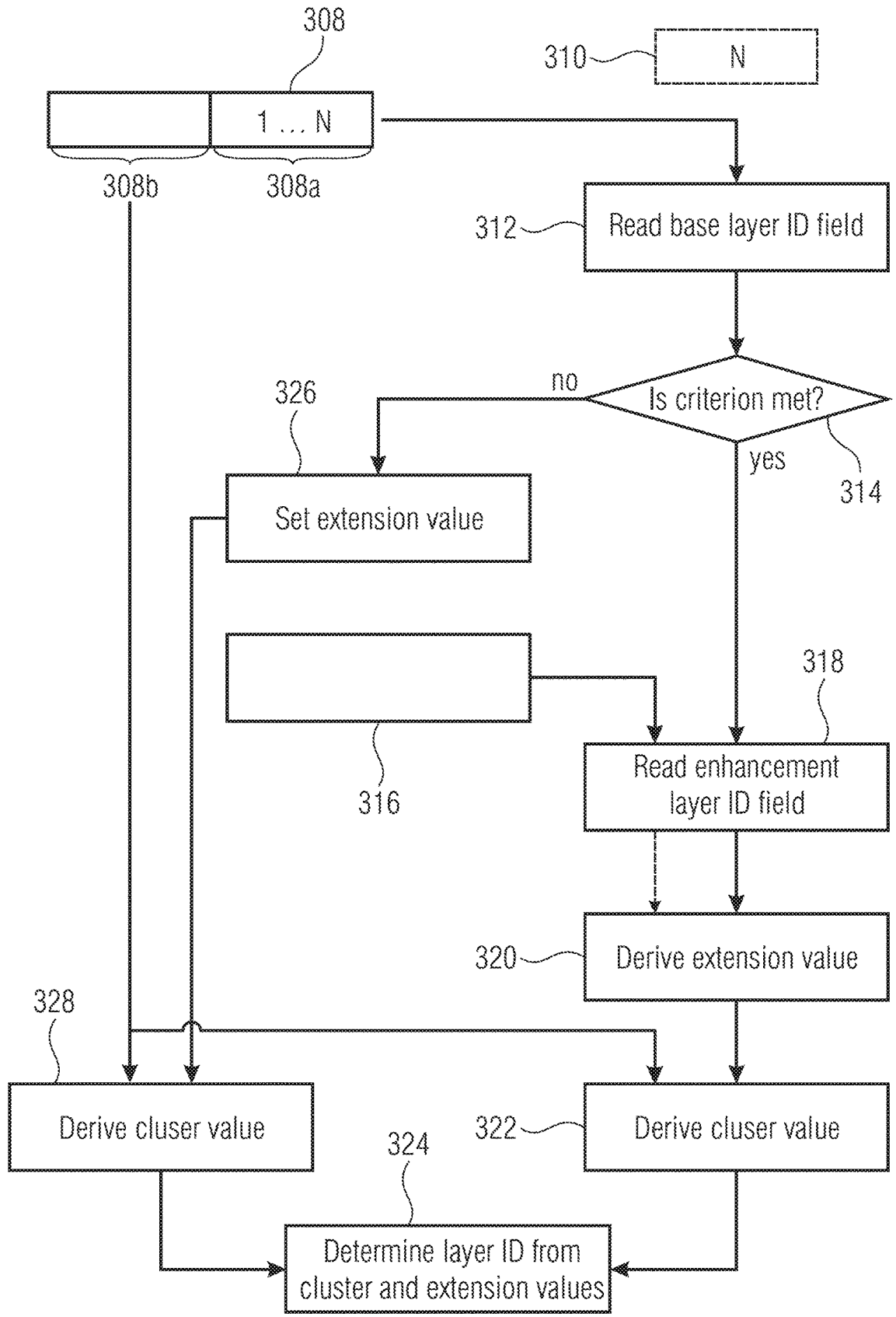
FIG. 21 shows a flow diagram illustrating the functionality of a network device deriving the layer-ID using the implemented relationship in accordance with the concept of FIG. 18.

In particular, as shown in FIG. 21, the device reads the base layer-ID field 308 from the multi-layer data stream or, to be more precise, from the current packet. The base layer-ID field comprises a first sub-field 308a and a second sub-field 308b. For example, the first sub-field may be formed by one or more least significant bits of field 308, while the second sub-field 308b is formed by the other most significant bits of field 308. As indicated in the example of FIG. 20b, a higher-level syntax element, called add_layer_id_ext_len 310 may define the length of sub-field 308a.

After reading the base layer-ID field 308 in step 312, the device checks whether the sub-field 308a fulfills a predetermined criterion in step 314. For example, the criterion is fulfilled if the sub-field is one or is an "all-ones sequences". In case of the predetermined criterion being fulfilled, the device reads an extension layer-ID field 316 from the data stream or, to be more precise, from the current packet, in step 318 and derives in step 320 an extension value using the extension layer-ID field so that the extension value lies within a first subset of a domain of extension values. The derivation in step 320 may correspond to a mere copying of the bit representation within field 316. It may be a requirement of the data stream that the value within extension layer-ID field 316 does not assume a certain value such as 0. It is the latter value which is reserved for the case that the base layer-ID field's 308 sub-field 308a does not fulfill the criterion as will be outlined further below.

After step 320, the device derives a cluster value from the second subfield 308b by mapping from a domain of possible values of the second sub-field 308b onto a domain of cluster values. The layer which the current packet is associated with, i.e. the one comprising fields 308 and 316 is then indexed using the cluster and the extension value derived in steps 320 and 322 in step 324. Cluster and extension values are, for example, simply concatenated to each other using, for example, the cluster value for the most significant digit. The derivation of the cluster value 322 on the basis of sub-field 308b may, for example, also consist of a direct usage of the bits of sub-field 308b as a binary representation of the cluster value.

However, if the check in step 314 results in the predetermined criterion not being met, the device refrains from reading an extension layer-ID field from the multi-layer data stream for the current packet. Rather, the device sets the extension value onto a value disjoint to the first subset of the domain of the extension values in step 326, such as by setting the extension value to zero, and derives the cluster value from the second sub-field 308b by mapping from the domain of possible values of the second sub-field 308b onto the domain of cluster values. The derivations in step 322 and 328 may be performed using the same mapping. Then, the layer-ID of the current packet is determined from the cluster and extension values as set and derived in steps 326 and 328, wherein the determination of the layer-ID may again be performed in the same manner as if the cluster and extension values were derived in steps 320 and 322.

Relating the description of FIG. 21 to the embodiment of FIG. 18, the first sub-field 308a may thus be 1 bit long and in particular be the LSB of field 308. The predetermined criterion may be fulfilled if this LSB 308a is won and the aforementioned domain of extension values spanned by extension layer-ID field 316 would be {0, 1, 2, 3} as, in case of FIG. 18, layer_id_ext, i.e. field 316, is 2 bits long. Accordingly, the first subset of the domain of extension values, i.e. the codomain of the derivation in step 320, would be {1, 2, 3}. In particular, the derivation in step 320 is, in the example of FIG. 18, embodied by way of a unitary matrix applied to the extension layer-ID field. Alternatively, some other computation may be used, such as adding the value of the first sub-field 308a to the result of the unitary matrix application. Accordingly, in step 326 the extension value is set to a value disjoint to {1, 2, 3}, namely 0. The mapping used in the derivations 322 and 328 may be the same, but may be different alternatively. The mapping may in particular be bijective.

The determination of the index in 324 may use the cluster value to set a more significant digit and the extension value to set a lower significant digit as illustrated in FIG. 18. Thus, as illustrated in FIG. 18, the layer_id_ext field, i.e. the extension layer-ID field 316, is merely present in case of the LSB of nuh_layer_id, i.e. base layer-ID field 308, being 1. Otherwise, the layer_id_ext field is inferred to be zero. Accordingly, the mapping of layer-IDs to the combinations of layer_id_ext and nuh_layer_id is completely symmetric and there is no unused bit representation. The inferred value of layer_id_ext may be exploited in the data stream by transmitting layer_id_ext such that the bits spanned in the data stream for the transmission of layer_id_ext is reduced so to account for the fact that layer_id_ext in fact merely assumes three different values {1, 2, 3}. For example, a binary unary code may be used to map the three elements of {1, 2, 3} onto binary strings which are then, for example, encoded into the data stream, and decoded therefrom, using entropy coding/decoding.

Thus, inter alias, it has been described with respect to the latter concept, a device configured to process a multi-layered data stream into which a video material is coded at different layers, corresponding to different levels of information amount, using inter-layer prediction, the multi-layer data stream comprising a plurality of packets, each of which is associated with one of the different layers, the device configured to, for each of the packets of the multi-layered data stream, read a base layer-ID field from the multi-layered data stream, the base layer-ID field comprising a first sub-field and a second sub-field; check as to whether the first sub-field of the base layer-ID field fulfills a predetermined criterion, and if the first sub-field of the base layer-ID field fulfills the predetermined criterion, read an extension layer-ID field from the multi-layered data stream, derive an extension value using the extension layer-ID field so that the extension value lies within a first subset of a domain of extension values, and derive a cluster value from the second sub-field by mapping from a domain of possible values of the second sub-field onto a domain of cluster values; and if the first sub-field of the base layer-ID field does not fulfill the predetermined criterion, refrain from reading an extension layer-ID field from the multi-layered data stream, set the extension value to a value disjoint to the first subset of the domain of extension values, and derive the cluster value from the second sub-field by mapping from the domain of possible values of the second sub-field onto the domain of cluster values, wherein the device indexes the layer which the respective packet is associated with using the cluster and extension values. It should be noted that the predetermined criterion may be read from the multi-layer data stream. As described above, "first sub-field" may be one bit long and, in particular, LSB; "predetermined criterion" may be "if one", "domain of extension values" may be, for example, {0, 1, 2, 3}, "first subset" may be {1, 2, 3}, "using the extension layer-ID field" may be a unitary matrix applied to extension layer-ID field, alternatively: adding the value of the first sub-field to the result of the unitary matrix application, "set the extension value to a value disjoint to" may be a setting "to 0"; "mapping from the domain of possible values of the first sub-field onto the domain of cluster values" may be the same for both cases, but may different alternatively; the mapping may be bijective, and "index the layer which the respective packet is associated with using the cluster and extension values" may involve using, for example, the cluster value for setting a, more significant digit and the extension value to set a lower significant digit.

The latter concept directly translates into an encoder configured to encode into a multi-layered data stream 204 a video material 202 at different layers, corresponding to different levels of information amount, using inter-layer prediction, the multi-layer data stream comprising a plurality of packets 206, each of which is associated with one of the different layers, wherein the layer which the respective packet is associated with, is uniquely determined by a cluster and extension value, the encoder configured to, for each for the packets 206 of the multi-layered data stream, if the extension value is within a first subset of a domain of extension values, insert a base layer-ID field 308 into the multi-layered data stream, the base layer-ID field comprising a first sub-field 308a and a second sub-field 308b, with using the cluster value to set the second sub-field and setting the first sub-field so as to fulfill a predetermined criterion; and insert an extension layer-ID into the multi-layered data stream, with using the extension value to set the extension layer-ID; and, if the extension value equals a value disjoint to the first subset of the domain of extension values, refrain from inserting an extension layer ID field and insert 312 a base layer-ID field 308 into the multi-layered data stream, the base layer-ID field comprising a first sub-field 308a and a second sub-field 308b, with using the cluster value to set the second sub-field and setting the first sub-field so as to not fulfill the predetermined criterion. That is, the encoder generates the data stream so that the decoder may derive the correct layer-ID in the manner outlined above and uses to this end inverse mappings compared to those outlined above with respect to the decoding or receiving side.

Summarizing above description, same provided an extension mechanism for the layer identifier of enhancement layer data, the grouping of layer identifiers into clusters and an efficient signaling of coding dependencies within clusters.

The details set out above may be apply to the data of enhancement layers in a layered coding scenario, while data of the base layer is kept unchanged. The base layer of the layered coding scenario may be identified through a layer identifier (cp. nuh_layer_id) in the common header syntax of base and enhancement layer data packets.

In the above examples, the respective device at the recipients side may be a video decoder. The video decoder, thus operating, would be able to select packets of the bitstream identified by (the extended) layerID for decoding.

The device could, however, alternatively be a network element which would be able to discard packets of a bitstream that are identified by (the extended) layerID based on external factors such as network utilization, knowledge about decoders, etc.

In all of the above embodiments, the multi-layered data stream may have the video material coded there into at the different layers using inter-layer prediction such that any layer inter-layer predicted from another layer adds one or more of further views; depth information; surface reflectance information; color component information; spatial resolution refinement; and SNR resolution refinement.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded signals mentioned above can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] B. Bross, W.-J. Han, J.-R. Ohm, G. J. Sullivan, T. Wiegand (Eds.), "High Efficiency Video Coding (HEVC) text specification draft 10", JCTVC-L1003, Geneva, CH, Jan. 2013
[2] G. Tech, K. Wegner, Y. Chen, M. Hannuksela, J. Boyce (Eds.), "MV-HEVC Draft Text 3 (ISO/IEC 23008-2 PDAM2)", JCT3V-C1004, Geneva, CH, Jan. 2013
[3] G. Tech, K. Wegner, Y. Chen, S. Yea (Eds.), "3D-HEVC Test Model Description, draft specification", JCT3V-C1005, Geneva, CH, Jan. 2013
[4] WILBURN, Bennett, et al. High performance imaging using large camera arrays. ACM Transactions on Graphics, 2005, 24. Jg., Nr. 3, S. 765-776.
[5] WILBURN, Bennett S., et al. Light field video camera. In: Electronic Imaging 2002. International Society for Optics and Photonics, 2001. S. 29-36.
[6] HORIMAI, Hideyoshi, et al. Full-color 3D display system with 360 degree horizontal viewing angle. In: Proc. Int. Symposium of 3D and Contents. 2010. S. 7-10.

What is claimed:

1. A device comprising:
 a video encoder configured to encode a video into a multi-layered video signal based on inter-layer prediction, wherein the multi-layered video signal includes information representing prediction residual and is composed of a sequence of packets each of which comprises a layer identification syntax element structure composed of a base layer-ID field and an extension layer-ID field; and a layer identification extender configured to:
insert, for a predetermined portion of the multi-layered video signal comprising a plurality of packets, a maximum syntax element into the multi-layered video signal, the maximum syntax element indicating a maximum value of the extension layer-ID field of the plurality of packets, and
determine a maximum number of layers within the predetermined portion of the multi-layered video signal based on the maximum value of the extension layer-ID field,
wherein the video encoder is configured to encode the video into the multi-layered video signal based on the maximum number of layers.

2. The device according to claim 1, wherein the multi-layered video signal has the video material coded thereinto as multiple different layers using inter-layer prediction such that any layer inter-layer predicted from another layer adds one or more of:
further views;
depth information;
alpha blending information;
color component information;
spatial resolution refinement; and
SNR resolution refinement.

3. The device according to claim 1, wherein layer identification extender is configured to determine at least one characteristic for each of the maximum number of layers based on a layer characterizing syntax portion of the multi-layered video signal, wherein the video encoder is configured to encode the video into the multi-layered video signal based on the layer characterizing syntax portion.

4. The device according to claim 1, wherein the layer identification extender is configured to derive a bit length of the extension layer-ID field using the maximum value of the extension layer-ID field.

5. The device according to claim 4, wherein the layer identification extender is configured to derive the bit length of the extension layer-ID field by rounding up the logarithm to base 2 of the maximum value of the extension layer-ID field.

6. The device according to claim 3, wherein the characteristic of a layer of the maximum number of layers relates to an inter-layer prediction dependency of that layer to any other of the maximum number of layers.

7. The device according to claim 1, wherein the layer identification extender is configured to acquire a bit length of the extension layer-ID field from an explicit signaling in the multi-layered video signal, wherein the maximum syntax element indicates the maximum value of the extension layer-ID field in units of one.

8. The device according to claim 1, wherein the layer identification extender is configured to, for each of the plurality of packets, determine a layer ID for the respective packet based on the layer identification syntax element structure by concatenating the base layer-ID field and extension layer-ID field.

9. The device according to claim 3, further comprising a network element configured to discard packets of the multi-layered video signal based on the characteristic determined for each layer.

10. The device according to claim 1, wherein the extension layer-ID field has a bit length equal to n signaled within the multi-layered video signal, and the maximum syntax element indicates the maximum value of the extension layer-ID field in units smaller than (n−1)2.

11. A device comprising:
a receiver configured to receive a multi-layered video signal composed of a sequence of packets each of which comprises a layer identification syntax element structure composed of a base layer-ID field and an extension layer-ID field;
a layer identification extender configured to:
obtain, for a predetermined portion of the multi-layered video signal comprising a plurality of packets, a maximum syntax element into the multi-layered video signal, the maximum syntax element indicating a maximum value of the extension layer-ID field of the plurality of packets, and
determine a maximum number of layers within the predetermined portion of the multi-layered video signal based on the maximum value of the extension layer-ID field; and
a video decoder configured to reconstruct a video based on inter-layer prediction using prediction residual from the plurality of packets and the maximum number of layers.

12. The device according to claim 11, wherein the multi-layered video signal has the video material coded thereinto as multiple different layers using inter-layer prediction such that any layer inter-layer predicted from another layer adds one or more of:
further views;
depth information;
alpha blending information;
color component information;
spatial resolution refinement; and
SNR resolution refinement.

13. The device according to claim 11, wherein layer identification extender is configured to determine at least one characteristic for each of the maximum number of layers based on a layer characterizing syntax portion of the multi-layered video signal, wherein the video decoder is configured to reconstruct the video based on the layer characterizing syntax portion.

14. The device according to claim 11, wherein the layer identification extender is configured to derive a bit length of the extension layer-ID field using the maximum value of the extension layer-ID field.

15. The device according to claim 14, wherein the layer identification extender is configured to derive the bit length of the extension layer-ID field by rounding up the logarithm to base 2 of the maximum value of the extension layer-ID field.

16. The device according to claim 13, wherein the characteristic of a layer of the maximum number of layers relates to an inter-layer prediction dependency of that layer to any other of the maximum number of layers.

17. The device according to claim 11, wherein the layer identification extender is configured to acquire a bit length of the extension layer-ID field from an explicit signaling in the multi-layered video signal, wherein the maximum syntax element indicates the maximum value of the extension layer-ID field in units of one.

18. The device according to claim 11, wherein the layer identification extender is configured to, for each of the plurality of packets, determine a layer ID for the respective packet based on the layer identification syntax element structure by concatenating the base layer-ID field and extension layer-ID field.

19. The device according to claim 11, wherein the extension layer-ID field has a bit length equal to n signaled within the multi-layered video signal, and the maximum syntax element indicates the maximum value of the extension layer-ID field in units smaller than (n−1)2.

20. A method comprising:
   encoding a video into a multi-layered video signal based on inter-layer prediction, wherein the multi-layered video signal includes information representing prediction residual and is composed of a sequence of packets each of which comprises a layer identification syntax element structure composed of a base layer-ID field and an extension layer-ID field;
   inserting, for a predetermined portion of the multi-layered video signal comprising a plurality of packets, a maximum syntax element into the multi-layered video signal, the maximum syntax element indicating a maximum value of the extension layer-ID field of the plurality of packets; and
   determining a maximum number of layers within the predetermined portion of the multi-layered video signal based on the maximum value of the extension layer-ID field, wherein encoding the video into the multi-layered video signal is further based on the maximum number of layers.

\* \* \* \* \*